(12) United States Patent
Liu et al.

(10) Patent No.: US 11,012,673 B2
(45) Date of Patent: May 18, 2021

(54) GRATING BASED THREE-DIMENTIONAL DISPLAY METHOD FOR PRESENTING MORE THAN ONE VIEWS TO EACH PUPIL

(71) Applicant: SUN YAT-SEN UNIVERSITY, Guangdong (CN)

(72) Inventors: Lilin Liu, Guangdong (CN); Dongdong Teng, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 16/479,926

(22) PCT Filed: Jan. 2, 2019

(86) PCT No.: PCT/CN2019/070029
§ 371 (c)(1),
(2) Date: Jul. 23, 2019

(87) PCT Pub. No.: WO2019/137272
PCT Pub. Date: Jul. 18, 2019

(65) Prior Publication Data
US 2019/0373239 A1 Dec. 5, 2019

(30) Foreign Application Priority Data

Jan. 12, 2018 (CN) .......................... 201810031064.6
Dec. 4, 2018 (CN) .......................... 201811475974.X

(51) Int. Cl.
*H04N 13/10* (2018.01)
*G02B 30/00* (2020.01)
(Continued)

(52) U.S. Cl.
CPC ............. *H04N 13/10* (2018.05); *G02B 27/00* (2013.01); *G02B 27/10* (2013.01); *G02B 30/00* (2020.01);
(Continued)

(58) Field of Classification Search
CPC ........ G02B 30/00; G02B 27/10; G02B 27/00; H04N 13/10
See application file for complete search history.

(56) References Cited

FOREIGN PATENT DOCUMENTS

| CN | 105611278 | 5/2016 |
| CN | 107529055 | 12/2017 |

(Continued)

OTHER PUBLICATIONS

"International Search Report (Form PCT/ISA/210) of PCT/CN2019/070029," dated Apr. 2, 2019, pp. 1-5.

*Primary Examiner* — Matthew Salvucci
(74) *Attorney, Agent, or Firm* — JCIPRNET

(57) ABSTRACT

The invention features techniques for presenting more than one perspective views to each eye of the viewer, through generating viewing zones with an interval smaller than the diameter of the viewer's pupil by display panel/grating pair/pairs. In the first method, the arraying direction of the small-interval viewing zones is designed having an appropriate small inclination angle to the line connecting the viewer's two pupils, so as to cover each eye with more than one viewing zones which are different with each other. In the extreme case, 4 small-interval viewing zones can implement 3D display with two views for each eye. This is absolutely different with existing grating-based 3D display, which aligns viewing zones along the direction with a small angle (<$\pi/4$) to the line connecting the viewer's two pupils and thus a rather large number of small-interval viewing zone is needed for covering the viewer's two eyes.

12 Claims, 17 Drawing Sheets

(51) Int. Cl.
*G02B 27/10* (2006.01)
*G02B 27/00* (2006.01)
H04N 13/30 (2018.01)
G06T 15/00 (2011.01)

(52) U.S. Cl.
CPC .......... *G06T 15/00* (2013.01); *G09G 2320/06* (2013.01); *H04N 2013/405* (2018.05)

(56) References Cited

FOREIGN PATENT DOCUMENTS

| WO | 2009122214 | 10/2009 |
|----|------------|---------|
| WO | 2017161674 | 9/2017  |

GRATING BASED THREE-DIMENTIONAL DISPLAY METHOD FOR PRESENTING MORE THAN ONE VIEWS TO EACH PUPIL

CROSS-REFERENCE TO RELATED APPLICATION

This application is a 371 application of an international PCT application serial no. PCT/CN2019/070029, filed on Jan. 2, 2019, which claims priority to and the benefit of China Patent Application No. 201810031064.6, filed on Jan. 12, 2018, and China Patent Application No. 201811475974.X, filed on Dec. 4, 2018. The entirety of each of the above-mentioned patent applications is hereby incorporated by reference herein and made a part of this specification.

BACKGROUND OF THE INVENTION

1. Field of the Invention

This invention is proposed for three-dimensional (3D) display, and more particularly enables presenting more than one perspective views to each pupil of the viewer for comfortable visual effect.

2. Description of Related Arts

Through projecting one perspective view to each pupil of the viewer, the stereoscopic display technology can provide 3D visual effect by the binocular depth cue. In those 3D display systems based on a technique called "auto stereoscopic", one-dimensional grating is often adhered to a display panel for generating multiple viewing zones for different pupils of the viewer/viewers. Subject to the resolution level of existing display panels, the number of generated viewing zones is often limited. In all existing grating-based 3D display projects, the periodic units of the one-dimensional grating are aligned with a rather small inclination angle to the line connecting the two pupils of the viewer. The resulted viewing zones are also aligned along the direction with the same small inclination angle to the line connecting the two pupils of the viewer. The binocular distance is significantly larger than the diameter of the viewer's pupil. So, in order to cover a viewer's two pupils, the limited viewing zones must have an interval larger than diameter of the viewer's pupil. That is to say, only one viewing zone is prepared for one pupil when the viewer watches the 3D display. So the 3D displays based on gratings often belong to the category of stereoscopic technology. The main drawback of the stereoscopic technology lies in the absence of monocular depth cue, resulting in the well-known vergence-accommodation conflict (VAC) problem. For a spatial point displayed by the stereoscopic technology, the convergence of the two passing-through light rays coming from the two perspective views for two pupils gives a virtual 3D depth perception to the user in the brain. However, due to the intensity gradient distribution of the light beams emitting from the display panel, the viewer naturally focuses his/her each eye on the display plane which contains the light-intensity extremum of each light beam along the propagating direction. Thus, a discrepancy between the convergence distance and the focusing distance, i.e. the above-mentioned VAC problem, appears. When observing a real object in the natural situation, two cone-shaped beams from a real object point cover each pupil of the viewer, respectively. The perceived cone-shaped beams not only make each corresponding eye focusing on the object point, but also let two corresponding eyes converging to the object point. That is to say, the convergence distance is consistent with the focusing distance. Therefore, the VAC in the stereoscopic display violates the human's physiological habit. Actually, this conflict is considered as the principle cause of visual fatigue, which is the uppermost bottleneck hindering the popularization of the 3D display technology.

Efforts were devoted to settle the VAC problem through grating-generated small-interval viewing zones with the interval smaller than the viewer's pupil diameter, however, due to the small inclination angle of the viewing zones' arraying direction to the line connecting two pupils of a viewer, the needed number of such small-interval viewing zones is so great that the prevailing display panel technique can't support.

Aiming at solving these problems above, this patent applying is on the method of resolving the VAC problem through a moderate or even very few numbers of grating-generated viewing zones.

SUMMARY OF THE INVENTION

The invention features methods on presenting more than one perspective views to each pupil of the viewer through a moderate, or even very few numbers of grating-generated small-interval viewing zones. The "small-interval viewing zones" means viewing zones with intervals smaller than the viewer's pupil diameter. Conversely, the "large-interval viewing zones" means viewing zones with intervals not smaller than the viewer's pupil diameter. These small-interval viewing zones are ingeniously designed to cover eyes of one viewer or even multiple viewers. Then each pupil could perceive more than one perspective views through covered small-interval viewing zones. Light rays passing through the small-interval viewing zones covered by a pupil superimpose into real spatial light spots that the corresponding eye can focus on naturally, thus overcoming the vergence-accommodation conflict.

In general, the invention includes a 3D display method of presenting more than one perspective views to each eye of the viewer by means of grating light-splitting, which comprises:

(S1) according to the application scenarios, place two pupils of a virtual viewer at the positions where two pupils of the viewer most frequently appear when he/she watches the flat display panel for 3D effect, with the reference direction being set along the line connecting the central points of the two virtual pupils and the reference vertical direction being perpendicular to the reference direction; (S2) adhere an one-dimensional grating to the flat display panel for directing light beams from M≥4 groups of pixels on the flat display panel to the corresponding M I-type viewing zones on the viewing-zone plane, respectively, with the arraying direction of the grating's periodic units being defined as the grating direction. The I-type viewing zones have the characteristics: the interval $\varDelta d$ between adjacent viewing zones along the grating direction is smaller than the pupil's diameter $D_{pupil}$, and the inclination angle $\varDelta \theta$ of the arraying direction of the viewing zones to the reference vertical direction satisfies arcsin $(D_{pupil}/D_{eye-eye}) \le abs(\varDelta \theta) \le min(arcsin((D_{pupil}+(M-2)/\varDelta d)/D_{eye-eye}), \pi/4)$, where $D_{eye-eye}$ is the viewer's eye distance; (S3) at time-point t, detect the concrete posture and position of the real viewer's pupils, draw the actual reference direction and the actual reference vertical direction correspondently, and determine the projection pupils of the real viewer's pupils. The projection pupil of a pupil is determined as following: the field angle of each pixel to the pupil intercepts an area on the viewing-zone plane, and all such intercepted areas together construct the projection pupil of this actual pupil; (S4) check the spatial relationship between the I-type viewing zones for the virtual viewer's pupils or determined at the last time-point and the projection pupils of the real viewer, making sure its satisfaction of the criteria that "each projection pupil of the real viewer intersects with more than one viewing zones and the viewing zones intersected by different projection pupils of this real viewer are absolutely different"; (S5) for a denial result, adjust the posture and position of the flat display panel/grating pair to meet the criteria of step (S4), or/and adjust the parameters of the flat display panel/grating pair to re-generate new I-type viewing zones for the real viewer's pupils; (S6) refresh each group of pixels on the flat display panel by the target three-dimensional scene's perspective view for the correspondent I-type viewing zone. A minimum M=4 represents the situation that two of four different perspective views are presented to each eye of a real viewer when his/her projection pupils just intersect with two groups of four I-type viewing zones respectively on the viewing-zone plane; (S7) at different time-points, implement steps (S3) to (S6) repeatedly.

A further 3D display method of presenting more than one perspective views to each eye of the viewer by means of grating light-splitting in this invention is:

(SS1) according to the application scenarios, place two pupils of a virtual viewer at the positions where two pupils of the viewer most frequently appear when he/she watches the curved display panel for 3D effect, with the reference direction being set along the line connecting the central points of the two virtual pupils and the reference vertical direction being perpendicular to the reference direction; (SS2) adhere an one-dimensional grating to the curved display panel for directing light beams from M'≥4 groups of pixels on the curved display panel to the corresponding NT II-type viewing zones on the viewing-zone plane, respectively, with the arraying direction of the grating's periodic units being defined as the grating direction. The II-type viewing zones have the characteristics: the interval $\Delta d$ between adjacent viewing zones along the grating direction is smaller than the maximum size $P_{pupil}$ of the viewer's projection pupils along the grating direction, and the inclination angle abs($\Delta\theta$) of the viewing zones' arraying direction to the reference vertical direction is designed appropriately for guaranteeing "each projection pupil of the virtual viewer intersects with more than one viewing zones and the viewing zones intersected by different projection pupils of this virtual viewer are absolutely different". Here the maximum value of abs($\Delta\theta$) is not larger than $\pi/4$, the abs( ) means the absolute function and the projection pupil of a pupil is determined as following: the field angle of each pixel to the pupil intercepts an area on the viewing-zone plane, and all such intercepted areas together construct the projection pupil of this pupil; (SS3) at time-point t, detect the concrete posture and position of the real viewer's pupils, draw the actual reference direction and the actual reference vertical direction correspondently, and determine the projection pupils of the real viewer's pupils; (SS4) check the spatial relationship between the II-type viewing zones for the virtual viewer's pupils or determined at the last time-point and the projection pupils of the real viewer, making sure its satisfaction of the criteria that "each projection pupil of the real viewer intersects with more than one viewing zones and the viewing zones intersected by different projection pupils of this viewer are absolutely different"; (SS5) for a denial result, adjust the posture and position of the curved display panel/grating pair to meet the criteria of step (SS4), or/and adjust the parameters of the curved display panel/grating pair to re-generate new II-type viewing zones for the real viewer's pupils; (SS6) refresh each group of pixels on the curved display panel by the target three-dimensional scene's perspective view for the correspondent II-type viewing zone. A minimum M=4 represents the situation that two of four different perspective views are presented to each eye of a real viewer when his/her projection pupils just intersect with two groups of four II-type viewing zones respectively on the viewing-zone plane; (SS7) at different time-points, implement steps (SS3) to (SS6) repeatedly.

An additional 3D display method of presenting more than one perspective views to each eye of the viewer by means of grating light-splitting in this invention includes:

(SSS1) according to the application scenarios, place two pupils of a virtual viewer at the positions where two pupils of the viewer most frequently appear when he/she watches the multi-view display panel for 3D effect, with the reference direction being set along the line connecting the central points of the two virtual pupils and the reference vertical direction being perpendicular to the reference direction. The multi-view display panel which is composed of a flat display panel and affiliated self-carried optical component/components can present multiple self-carried viewing zones. Here the self-carried viewing zones aligned along the direction with an inclination angle smaller than $\pi/4$ to the reference direction have the characteristics: light rays passing through one self-carried viewing zone must not reach both pupils of a viewer simultaneously; (SSS2) adhere an one-dimensional grating to the flat display panel of the multi-view display panel for directing light beams from N≥2 groups of pixels on the flat display panel to corresponding N III-type viewing zones on the viewing-zone plane respectively, with the arraying direction of the one-dimensional grating's periodic units named as the grating direction. The III-type viewing zones have the characteristics: the interval $\Delta d$ between adjacent viewing zones along the grating direction is smaller than the pupil's diameter $D_{pupil}$, and the inclination angle abs($\Delta\theta$) of the viewing zones' arraying direction to the reference vertical direction satisfies abs($\Delta\varphi$)≤min(arcsin(((N-2)/$\Delta d+D_{pupil}$)/$D_{eye\text{-}eye}$), $\pi/4$), where $D_{eye\text{-}eye}$ is the viewer's eye distance; (SSS3) at time-point t, detect the concrete posture and position of the real viewer's pupils, draw the actual reference direction and the actual reference vertical direction correspondently, and determine the projection pupils of the real viewer's pupils. The projection pupil of a pupil is determined as following: the field angle of each pixel on the curved display panel to the pupil intercepts an area on the viewing-zone plane, and all such intercepted areas together construct the projection pupil of this actual pupil; (SSS4) check the spatial relationship between the III-type viewing zones for the virtual viewer's pupils or determined at the last time-point and the projection pupils of the real viewer, making sure its satisfaction of the criteria that "each projection pupil of the real viewer intersects with more than one viewing zones"; (SSS5) for a denial result, adjust the posture and position of the multi-view display panel/grating pair to meet the criteria of step (SSS4), or/and adjust the parameters of the multi-view display panel/grating pair to re-generate new III-type viewing zones for the real viewer's pupils; (SSS6) refresh each group of pixels on the flat display panel by the target three-dimensional scene's perspective view for the correspondent III-type viewing zone/self-carried viewing zone pair. The minimum N=2 represents the situation that two perspective views are presented to each eye of a real viewer by the help of self-carried viewing zones when his/her two projection pupils both intersect with the N=2 III-type viewing zones; (SSS7) at different time-points, implement steps (SSS3) to (SSS6) repeatedly.

Still a further 3D display method of presenting more than one perspective views to each eye of the viewer by means of grating light-splitting in this invention as following:

(SSSS1) according to the application scenarios, place two pupils of a virtual viewer at the positions where two pupils of the viewer most frequently appear when he/she watches the multi-view display panel for 3D effect, with the reference direction being set along the line connecting the central points of the two virtual pupils and the reference vertical direction being perpendicular to the reference direction. The multi-view display panel which is composed of a curved display panel and affiliated self-carried optical component/components can present multiple self-carried viewing zones. Here the self-carried viewing zones aligned along the direction with inclination angles smaller than π/4 to the reference direction have the characteristics: light rays passing through one self-carried viewing zone must not reach both pupils of a viewer simultaneously; (SSSS2) adhere an one-dimensional grating to the curved display panel of the multi-view display panel for directing light beams from N'≥2 groups of pixels on the curved display panel to corresponding N' IV-type viewing zones on the viewing-zone plane respectively, with the arraying direction of the one-dimensional grating's periodic units named as the grating direction. The IV-type viewing zones have the characteristics: the interval $\varDelta$ d between adjacent viewing zones along the grating direction is smaller than the maximum size $P_{pupil}$ of the viewer's projection pupils along the grating direction, and the inclination angle abs($\varDelta$ θ) of the viewing zones' arraying direction to the reference vertical direction must be small enough for guaranteeing "each projection pupil of the virtual viewer intersects with more than one IV-type viewing zones". The projection pupil of a pupil is determined as following: the field angle of each pixel to the pupil intercepts an area on the viewing-zone plane, and all such intercepted areas together construct the projection pupil of this pupil; (SSSS3) at time-point t, detect the concrete posture and position of the real viewer's pupils, draw the actual reference direction and the actual reference vertical direction correspondingly, and determine the projection pupils of the real viewer's pupils; (SSSS4) check the spatial relationship between the IV-type viewing zones for the virtual viewer's pupils or determined at the last time-point and the projection pupils of the real viewer, making sure its satisfaction of the criteria that "each projection pupil of the viewer intersects with more than one viewing zones"; (SSSS5) for a denial result, adjust the posture and position of the multi-view display panel/grating pair to meet the criteria of step (SSSS4), or/and adjust the parameters of the multi-view display panel/grating pair to re-generate new IV-type viewing zones for the real viewer's pupils; (SSSS6) refresh each group of pixels on the curved display panel by the target three-dimensional scene's perspective view for the correspondent IV-type viewing zone/self-carried viewing zone pair. The minimum N'=2 represents the situation that two perspective views are presented to each eye of a real viewer by the help of self-carried viewing zones when his/her two projection pupils both intersect with the N'=2 IV-type viewing zones; (SSSS7) at different time-points, implement steps (SSSS3) to (SSSS6) repeatedly.

The multi-view display panel may be a display panel with self-carried grating which directs light beams from different groups of pixels on the display panel to different self-carried viewing zones. Under this condition, the self-carried grating is called as the affiliated self-carried optical component of the display panel. The multi-view display panel may be a display panel with multiple sequentially and circularly incident light beams converging to different self-carried viewing zones. Under this condition, the self-carried optical component/components is/are the optical element/elements providing sequentially and circularly incident light beams, such as several sequentially-turned-on-and-turned-off point-light-sources and a convergent lens placed between the point-light-sources and the display panel. The multi-view display panel may be a display panel with each pixel having a micro-structure, such as a micro/nano grating or controllable micro mirrors, etc., which directs lights from different group of pixels to different self-carried viewing zones.

Yet another 3D display method of presenting more than one perspective views to each eye of the viewer by means of grating light-splitting in this invention is:

(SSSSS1) adhere a grating to a display panel for directing light beams from L≥2 groups of pixels on the display panel to corresponding L viewing zones which are named as initial viewing zones respectively, and then insert a projecting lens between the display panel/grating pair and the initial viewing zones to zoom in the display panel and zoom out the initial viewing zones. The zoomed-in display panel is named as the effective display panels, the zoomed-out initial viewing zones are named as V-type viewing zones which have an interval of $\varDelta$ d smaller than the pupil's diameter $D_{pupil}$, and the combination of the projecting lens and the display panel/grating pair is named as a projecting unit; (SSSSS2) align two or more projecting units along one dimension or two dimensions for generating more V-type viewing zones for the eyes of the viewer/viewers. The relative position of the projecting lens and the display panel in each projecting unit may be different for projecting their effective display panels around the target three-dimensional scenes; (SSSSS3) at time-point t, each group of pixels on each display panel get refreshed by the target three-dimensional scene's perspective view for the correspondent V-type viewing zone; (SSSSS4) at different time-points, implement steps (SSSSS3).

Furthermore, the projecting unit may have one or more of following components inserted between the display panel and the V-type viewing zones: a guiding component to re-direct propagating direction of the light beams from the display screen to corresponding V-type viewing zones, and/or a combination component for mixing the displayed target three-dimensional scene and the real scene, and/or a compensation component for eliminating the influence of inserted component/components on the light from real scene The details of one or more embodiments of the invention are set forth in the accompanying drawings and descriptions below. Other features, objects, and advantages of the invention will be apparent from the description, drawings, and claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS 3D display methods that embody the invention take the features of small-interval viewing zones, which are generated by the gratings according to the grating light-spitting principle. Through controlling the arraying direction of the generated viewing zones, or by drawing supports from those multi-view display panels which project large-interval self-carried viewing zones along the line connecting two eyes of the viewer, or by arraying multiple display panel/grating pairs, light beams passing through more than one small-interval viewing zones can enter each pupil of a viewer or multiple viewers. Light rays passing through the small-interval viewing zones covered by a pupil superimpose into real spatial light spots that the corresponding eye can focus on naturally, thus overcoming of the vergence-accommodation conflict.

Figure 1:
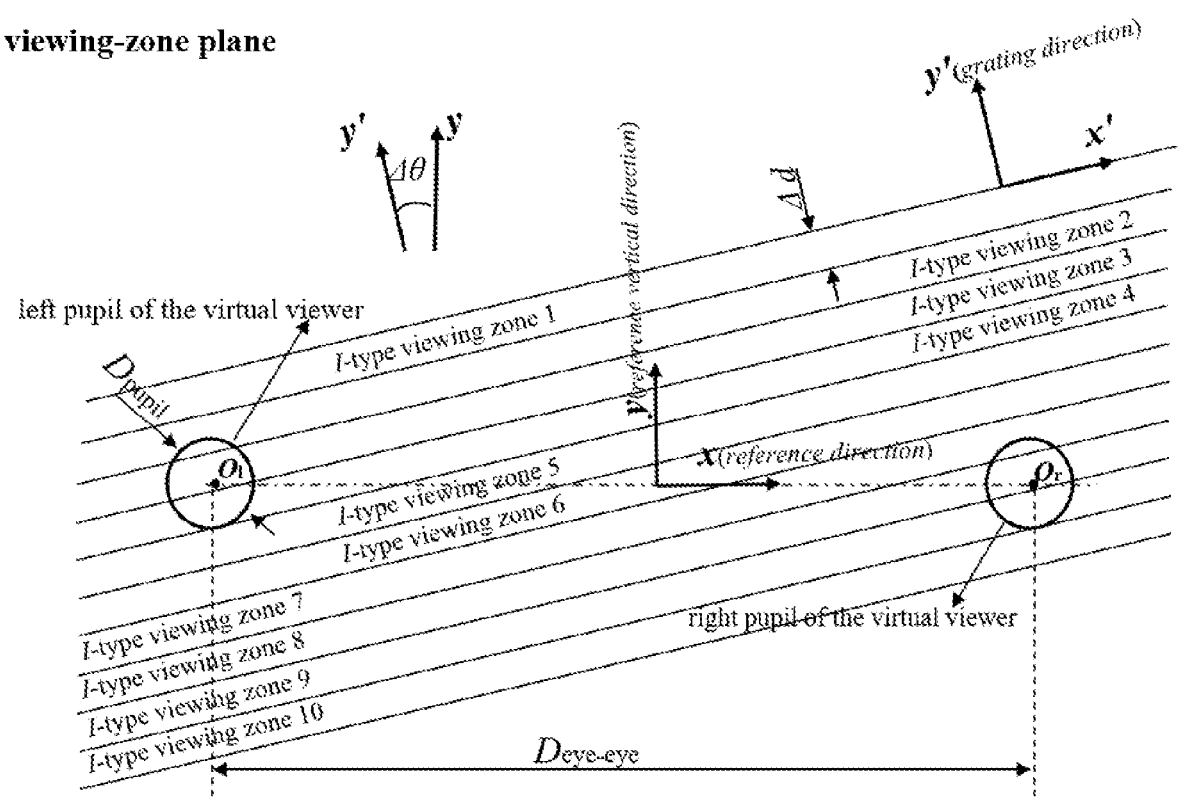
FIG. 1 shows the general spatial direction relation of the I-type viewing zones with the viewer's pupils.
Figure 2:
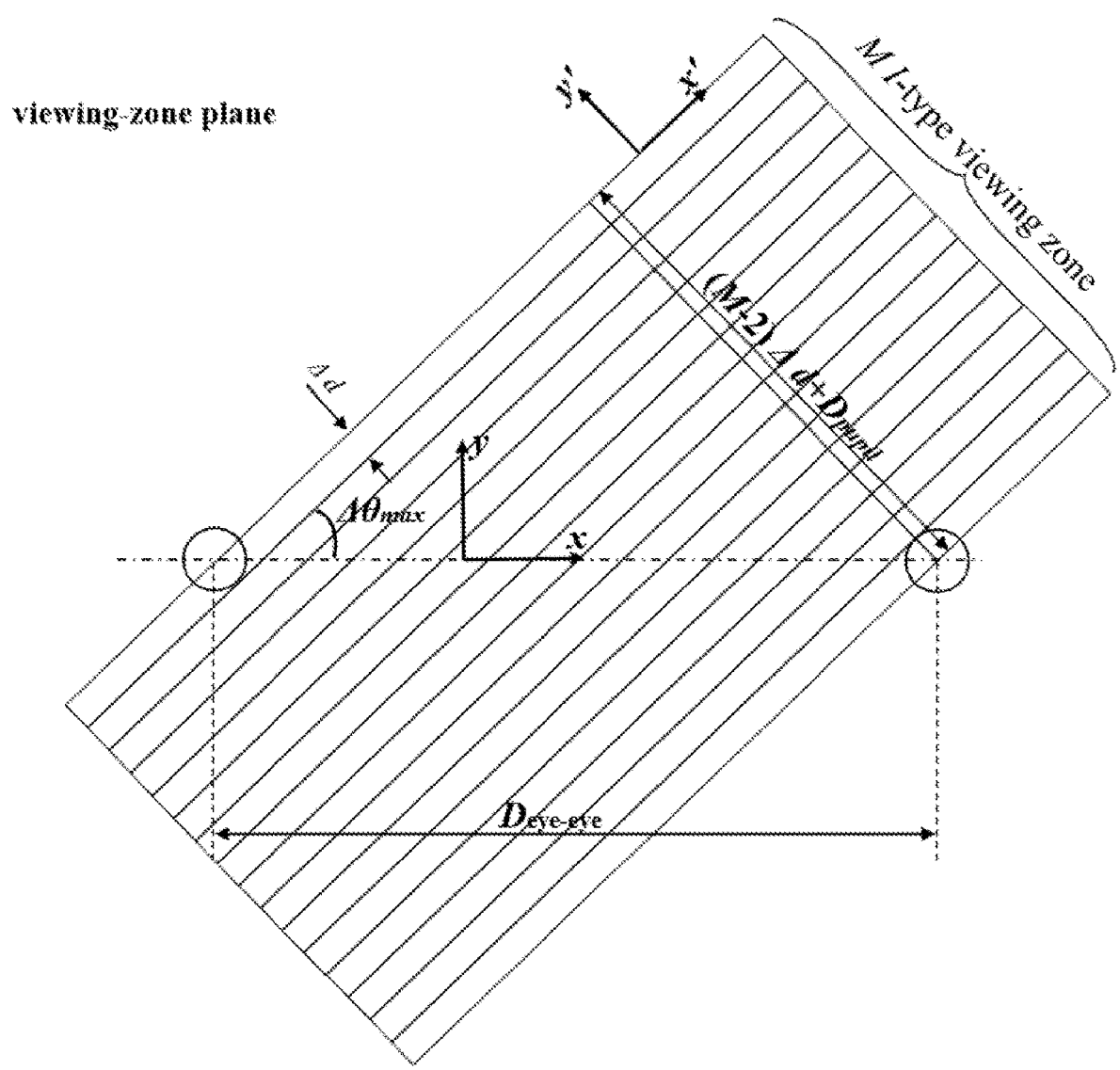
FIG. 2 shows the spatial direction relation of the I-type viewing zones with the viewer's pupils for allowable maximum value of abs($\Delta\theta$) when $D_{pupil}=2\Delta d$.
Figure 3:
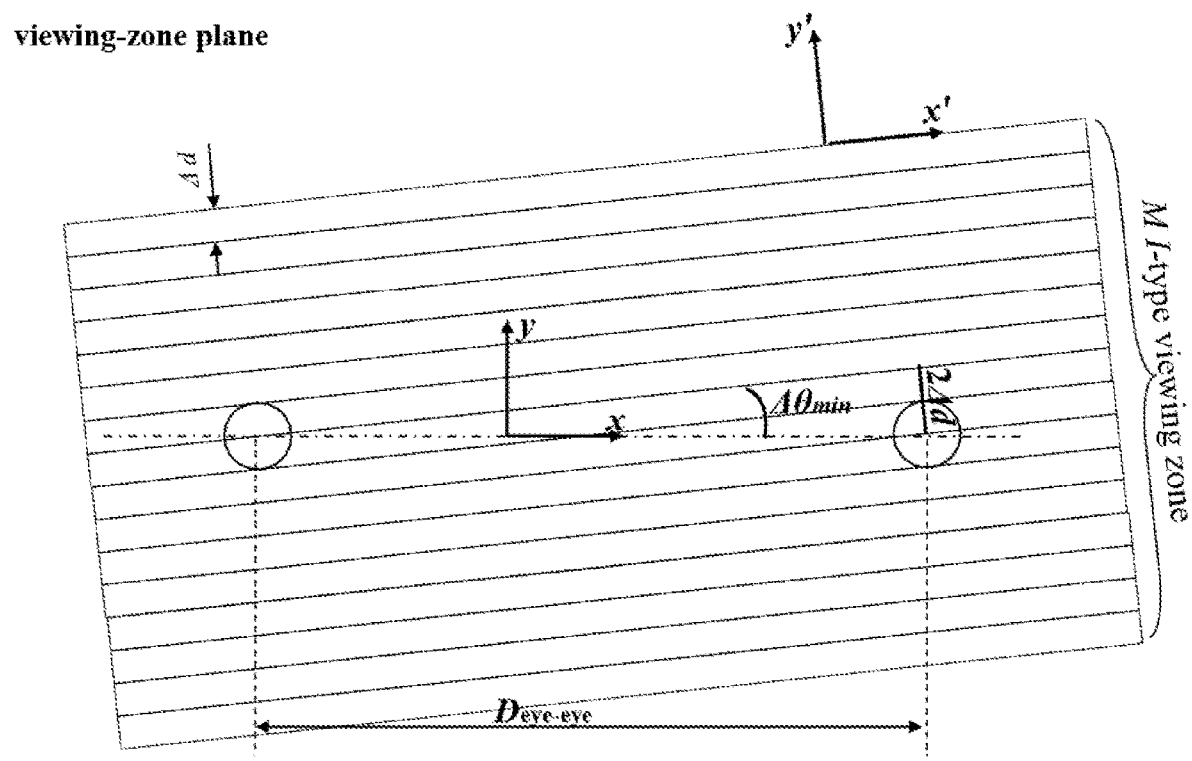
FIG. 3 shows the spatial direction relations of the I-type viewing zones with the pupils' location for allowable minimum value of abs($\Delta\theta$) when $D_{pupil}=2\Delta d$.

FIG. 1 shows the spatial direction relation of the I-type viewing zones with the pupils of the viewer locating in the viewing-zone plane. The reference direction is along the line connecting central points of the viewer's two pupils, and the reference vertical direction is perpendicular to the reference direction. $D_{eye-eye}$ is the eye distance of the viewer, i.e. the distance between the central point $O_l$ and point $O_r$ of the left pupil and the right pupil in the FIG. 1. The I-type viewing zones are generated by a one-dimensional flat display panel/grating pair, with the grating's periodic units aligned along the grating direction. The generated I-type viewing zones are also aligned along the grating direction. In FIG. 1, the reference direction, the reference vertical direction, and the grating direction are denoted by x-direction, y-direction, and y'-direction, respectively. $\Delta\theta$ denotes the acute angle between the grating direction and the reference vertical direction. The x'-direction is perpendicular to the y'-direction. The I-type viewing zones have some characteristics for presenting more than one perspective views to each eye of the viewer. Firstly, the number M of the generated I-type viewing zones must not be less than 4. Here M=10 I-type viewing zones are taken as an example in the FIG. 1. Secondly, the interval $\Delta d$ between adjacent I-type viewing zones along the grating direction is less than the diameter of viewer's pupil $D_{pupil}$. The viewing zones with $\Delta d<D_{pupil}$ is called "small-interval viewing zones" in this applying file. The third one lies in the appropriately setting of $\Delta\theta$, so as to guarantee that each pupil of the viewer can intersect with more than one I-type viewing zones and the viewing zones intersected by different pupils of the viewer are absolutely different. As shown in the FIG. 1, the I-type viewing zones from 2 to 4 intersect with the viewer's left pupil, and the I-type viewing zones from 7 to 9 intersect with the viewer's right pupil, with the I-type viewing zones 1, 5, 6 and 10 being idle. Under this condition, the left eye will perceive the perspective views corresponding to the I-type viewing zones from 2 to 4, the right eye will perceive the perspective views corresponding to the I-type viewing zones from 7 to 9. FIG. 2 and FIG. 3 show the allowable maximum abs($\Delta\theta$), estimated by $\arcsin((D_{pupil}+(M-2)/\Delta d)/D_{eye-eye})$ and minimum abs($\Delta\theta$), estimated by $\arcsin(D_{pupil}/D_{eye-eye})$, respectively, when $D_{pupil}=2/\Delta d$. Especially in the FIG. 3, very few I-type viewing zones, M=4, can realize more than one perspective views for each pupil of the viewer when the value of abs($\Delta\theta$) gets a little smaller. Here abs( ) means the absolute function. This is also applicable for $D_{pupil}<2/\Delta d$ and $D_{pupil}>2/\Delta d$. When the maximum value of abs($\Delta\theta$)≥π/4 is chosen, too many I-type viewing zones are needed for satisfying the necessary condition that light beams passing through more than one small-interval viewing zones can enter each pupil of a viewer. For example, with $\Delta\theta=\pi/4$, average $D_{eye\text{-}eye}=64$ mm, average $D_{pupil}=3$ mm and $D_{pupil}=2\Delta d$, at least M=30 I-type viewing zones are necessary for just covering two eyes of a viewer. This applying patent is on proposing a method of covering two pupils of a viewer with moderate or even very few number of grating-generating small-interval viewing zones. So, the value of abs($\Delta\theta$) is limited not larger than $\pi/4$. Thus, the value range of the abs($\Delta\theta$) can be determined by the formula:

$$\arcsin(D_{pupil}/D_{eye\text{-}eye})\leq abs(\Delta\theta)\leq\min(\arcsin((D_{pupil}+(M-2)/\Delta d)/D_{eye\text{-}eye}),\pi/4).$$

Actually, at the situation of maximum abs($\Delta\theta$), a slight translation of the viewer's head leads to detaching of one pupil from the status of intersecting with more than one I-type viewing zones. At the situation of minimum abs($\Delta\theta$), a slight rotation of the viewer's head may lead to sharing a common viewing zone by the two pupils. These two situations both shall be avoided to satisfy the characteristic that "each pupil of the viewer intersects with more than one viewing zones and the viewing zones intersected by different pupils of the viewer are absolutely different". So, practically, the adopted value of abs($\Delta\theta$) should be away from the maximum value or the minimum value, so to allow idle viewing zone/zones always existing around each pupil. As shown in FIG. 1, idle viewing zones exist, e.g. I-type viewing zones 1, 5, and 6.

Figure 4:
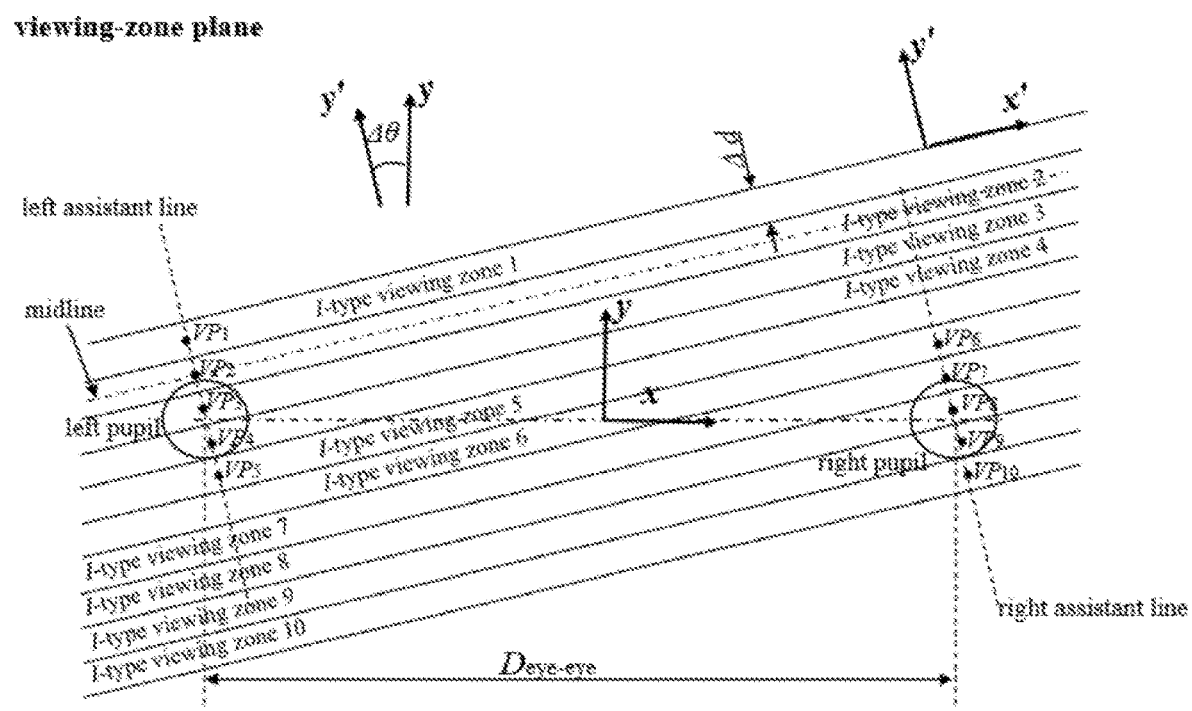
FIG. 4 shows a determining method of the viewpoint corresponding to each I-type viewing zone.

According to the application scenarios, firstly, locate two pupils of a virtual viewer at the position where the pupils of a viewer appear most frequently and set the reference direction. $D_{pupil}$ and $D_{eye\text{-}eye}$ both take average values. Then a one-dimensional grating is adhered to the flat display panel for sending I-type viewing zones to the virtual viewer's two pupils based on the grating light-splitting principle. The grating may be slit grating, or lenticular screen, or other types of one-dimensional grating with the light-splitting capability. According to their spatial relationship, the viewing zones intersecting with each pupil are determined. The pixel group corresponding to each intersecting viewing zone gets refreshed by the perspective view corresponding to this viewing zone. During this process, the concrete viewpoint of each viewing zone should be specified. With the premise that the viewpoint for an intersecting viewing zone should be around the corresponding pupil, there are multiple rules to determine the viewpoint of each viewing zone. For example, through the central point of a pupil, we draw an assistant line. For each I-type viewing zone intersecting with the pupil, the intersection point of the viewing zone's midline with the assistant line is taken as the viewpoint of this I-type viewing zone, such as the $VP_2$, $VP_3$, $VP_4$ for the left pupil and $VP_7$, $VP_8$, $VP_9$ for the right pupil in the FIG. 4. The assistant lines used here are straight lines along the grating direction, and the interval between adjacent viewpoints along the grating direction is identical. But this exampled method is not obligatory. The assistant line may be curved line, even with unequally spaced viewpoints on. Beside the intersecting viewing zones, the idle I-type viewing zones near to each pupil are also assigned to this pupil as affiliated viewing zones. Then the viewpoints of these affiliated viewing zones are set according to the same rule, such as the $VP_1$, $VP_5$, $VP_6$ and $VP_{10}$ of the FIG. 4. For a pupil, the intersecting viewing zones and the affiliated viewing zones both are taken as the relevant viewing zones of this pupil in this applying patent.

Figure 5:
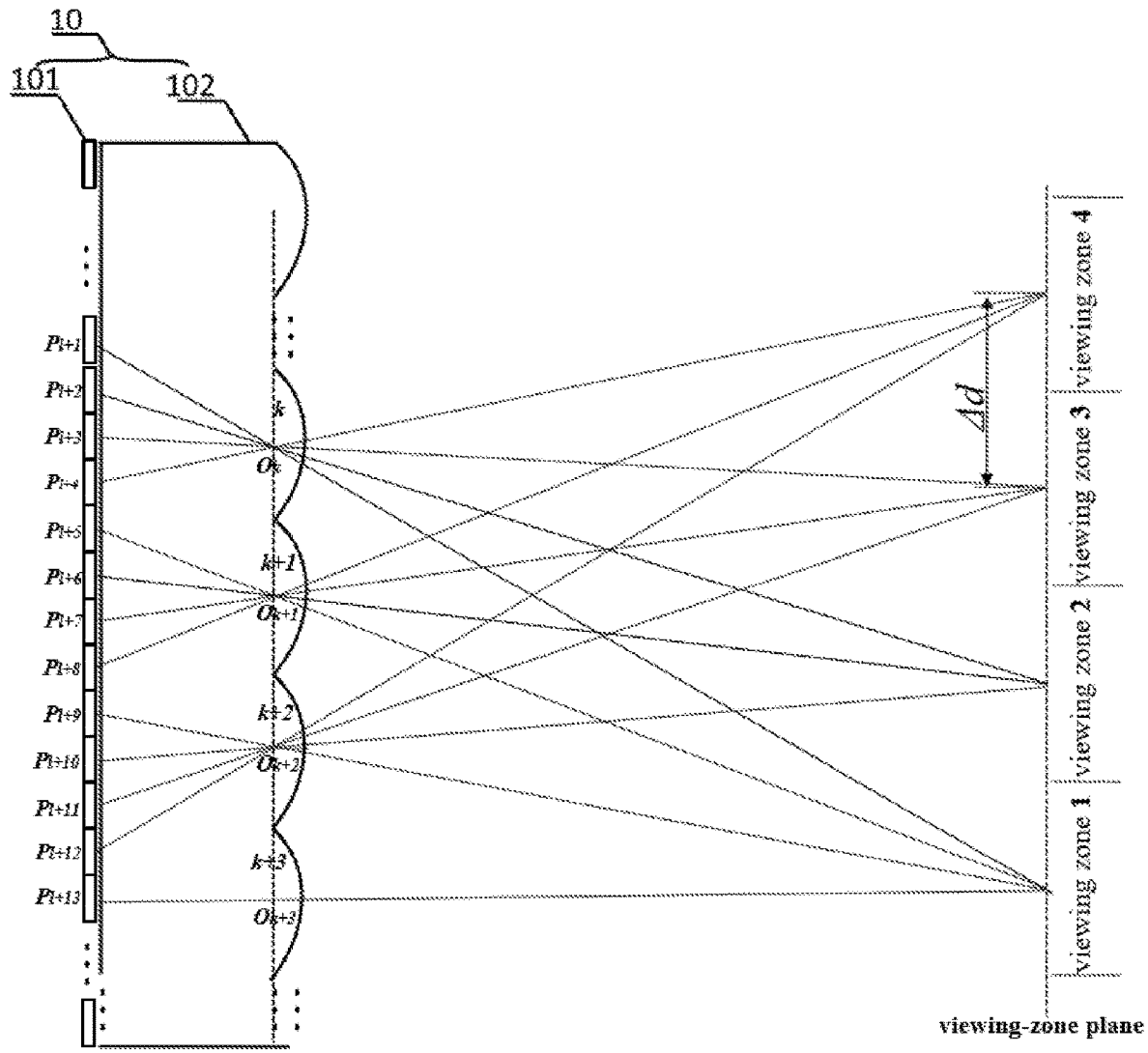
FIG. 5 shows the corresponding relationship between the generated viewing zones and the pixels/grating-unit group.
Figure 6:
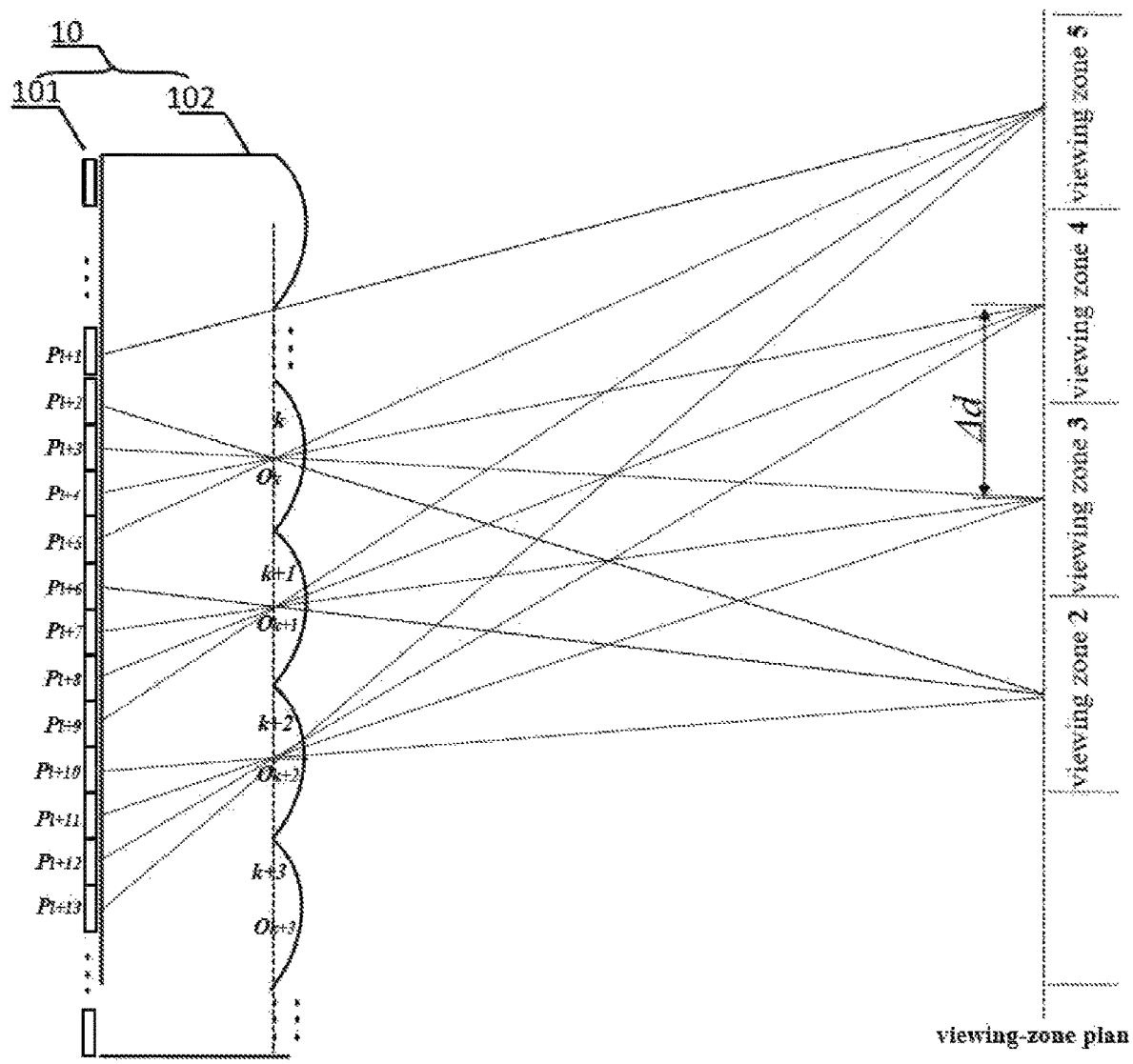
FIG. 6 shows the translating rule of the generated viewing zones with changing of the pixels/grating-unit group.

In the practical application, the viewer is always moving somewhat. Firstly, through tracing, the pupils of the virtual viewer are replaced by the real viewer's pupils in the FIG. 1. Then, check whether the I-type viewing zones generated according to the virtual viewer's pupils meet the demands "each pupil of the real viewer intersects with more than one viewing zones and the viewing zones intersected by different pupils of the real viewer are absolutely different". If the demands are met, no changing is needed, or only the viewpoint of each viewing zone is reset according to the positions of the real viewer's pupils. If the demands are not met, the reference direction and the reference vertical direction shall be renewed according to the concrete posture and position of the real viewer's pupils. Through adjusting the parameters of the flat display panel/grating pair, new I-type viewing zones are re-generated for the real viewer's pupils. For example, if a slit grating based on controllable liquid crystal is employed, the grating space can be adjusted to change the value of $\Delta d$, the position of the viewing-zone plane, and the number of generated viewing zones. The grating direction can also be adjusted to change the value of $\Delta\theta$. Another example, resetting the pixels corresponding to each periodic unit of the grating also can make the generated viewing zones move along with the motion of the viewer's pupils. As shown in FIG. 5, the one-dimensional grating 102 directs light beams from different groups of pixels on the flat display panel 101 to corresponding different viewing zones. Here the lenticular screen is employed as the one-dimensional grating and 4 viewing zones are taken as an example. Concretely, pixels $p_{1+1}$, $p_{1+2}$, $p_{1+3}$ and $p_{1+4}$ are set passing through lenticular unit k, pixels $p_{1+5}$, $p_{1+6}$, $p_{1+7}$ and $p_{1+8}$ are set passing through lenticular unit k+1, pixels $p_{1+9}$, $p_{1+10}$, $p_{1+11}$ and $p_{1+12}$ are set passing through lenticular unit k+2, and so on. Thus, 4 viewing zones are generated on the viewing-zone plane, which are viewing zone 1, viewing zone 2, viewing zone 3 and viewing zone 4 in the FIG. 5. Then, we change the corresponding pixels of each lenticular unit. For example, pixels $p_{1+2}$, $p_{1+3}$, $p_{1+4}$ and $p_{1+5}$ are set passing through lenticular unit k, pixels $p_{1+6}$, $p_{1+7}$, $p_{1+8}$ and $p_{1+9}$ are set passing through lenticular unit k+1, pixels $p_{1+10}$, $p_{1+11}$, $p_{1+12}$ and $p_{1+13}$ are set passing through lenticular unit k+2, and so on as shown in the FIG. 6. According to the light-splitting principle, the lower viewing zone 1 in the FIG. 5 no longer plays a role, and a new viewing zone 5 gets generated at the new position in the FIG. 6. Obviously, through resetting the pixels corresponding to each periodic unit of the grating, the effective viewing zones can be translated. Instead of adjusting the parameters of the flat display panel/grating pair, a simple method is to adjust the posture and position of the flat display panel/grating pair accompanying with the motion of the viewer. The premise is that the relative position of the viewing zones to the viewer's pupils keeps being within a range where the viewing zones can keep holding the characteristics of the I-type viewing zones. When the viewpoints of the I-type viewing zones are determined, refresh each group of pixels on the display panel by the target three-dimensional scene's perspective view corresponding to the corresponding I-type viewing zone's viewpoint. Especially, a minimum M=4 corresponds to the situation that two of four different perspective views are presented to each eye of a real viewer when his/her projection pupils just intersect with two groups of four I-type viewing zones respectively on the viewing-zone plane.

Figure 7:
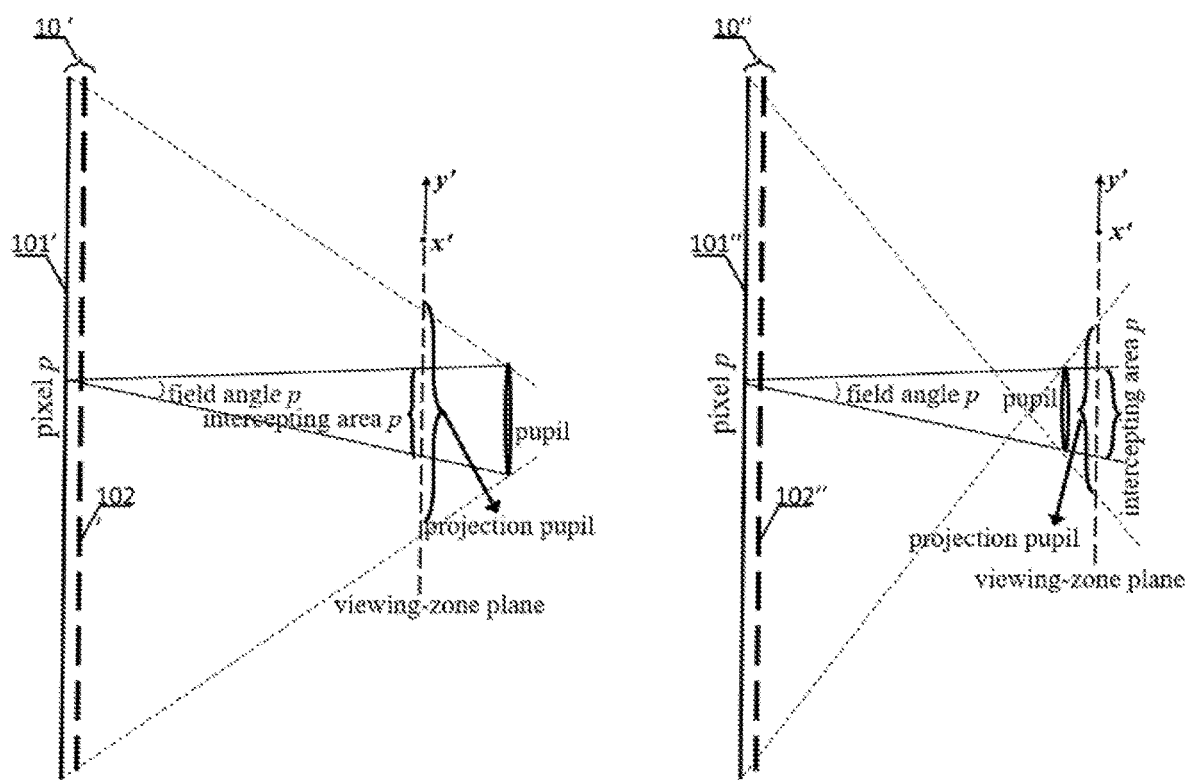
FIG. 7 shows the projection pupil of a pupil deviating away from the viewing-zone plane by some distance.

Furthermore, the motion of the viewer always is not in the viewing-zone plane. Actually, the pupils of the viewer often deviate from the viewing-zone plane when he/she watches the displayed 3D scenes. Under this condition, light beams passing through more viewing zones will be perceived by each eye, compared with the situation that the pupil is just on the viewing-zone plane. As shown in FIG. 7, the flat display panel/grating pair 10' or 10" projects viewing zones on the corresponding viewing-zone plane. A pupil is deviated from the viewing-zone plane by some distance. The field angle of a pixel on the flat display panel with respect to this pupil will intercept an area on the viewing-zone plane. With a pixel p as an example in the FIG. 7, its corresponding field angle p intercepts an area on the viewing-zone plane, the intercepted area p. Each pixel on the flat display panel will intercept such an area correspondingly. All these intercepted areas combine into a region, which is named as the projection pupil. The left and right figures of the FIG. 7 correspond to the two situations. Then, with the viewer's projection pupils on the viewing-zone plane, we check whether the demand "each projection pupil of the viewer intersects with more than one I-type viewing zones for the virtual viewer's pupils and viewing zones intersected by different projection pupils of the viewer are absolutely different" is satisfied. Then, the processes are carried through methods described in the previous paragraph. In this applying file, including the previous part, "the viewing zones covered by the pupil" or "the covered viewing zones" means the viewing zones intersected by this or a pupil's projection pupil.

Then, at different time-points, repeat the above processes of tracing, judging, and information refreshing.

In the judging process, the above criteria "each projection pupil of the viewer intersects with more than one I-type viewing zones for the virtual viewer's pupils and viewing zones intersected by different projection pupils of the viewer are absolutely different" may change to "each projection pupil of the viewer intersects with more than one I-type viewing zones determined at the last time-point and viewing zones intersected by different projection pupils of the viewer are absolutely different".

In some conditions, the tracing of the viewer is not necessary. For example, the viewer's motion is very limited. At the maximum motion journey, each projection pupil does not walk out of the range of initial relevant I-type viewing zones of the corresponding pupil. Under this condition, the tracing of the pupils is unnecessary. Another example, the available observing zone constructed by the I-type viewing zones is very narrow. Once the pupils miss this observing zone, the perceived three dimensional effect gets obviously worsen. If so, the viewer can get back to the observing zone through simply adjusting the posture and position of the flat display panel/grating pair. Under this condition, the tracing of the pupils is also unnecessary.

Figure 8:
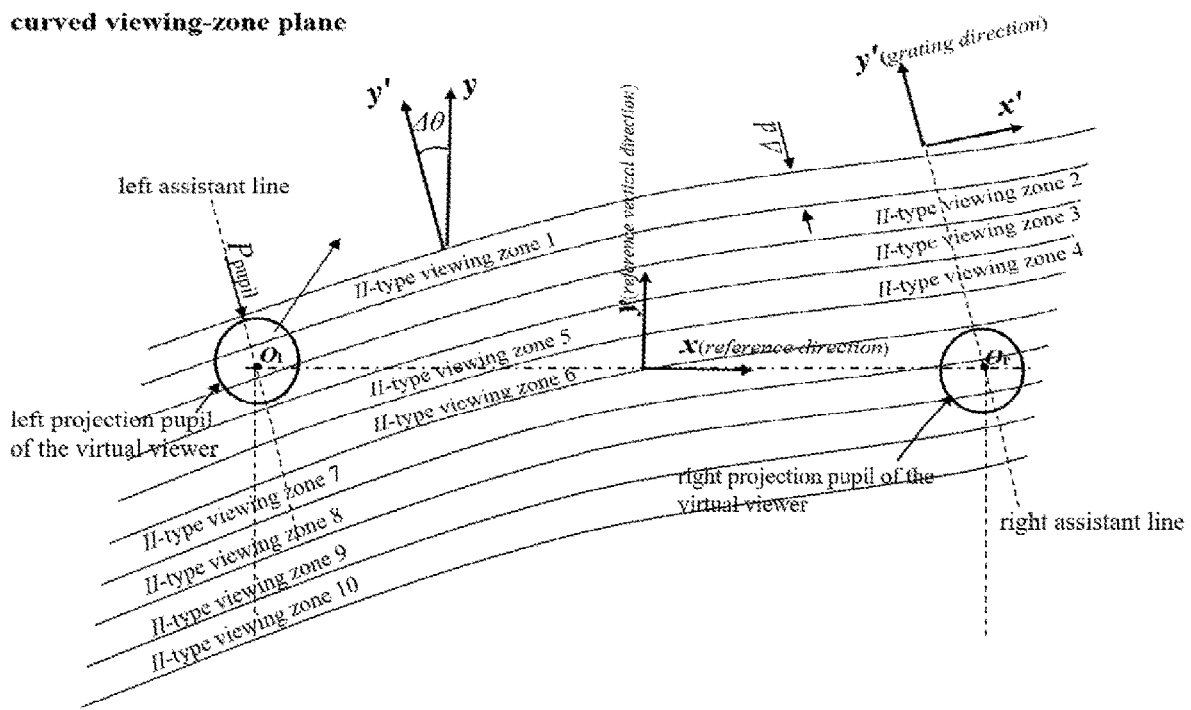
FIG. 8 shows the general spatial direction relation of the II-type viewing zones with the viewer's projection pupils on the curved viewing-zone plane.

When the curved display panel is employed instead of the flat display panel, operations similar to those described in the above embodiments are also applicable. Firstly, according to the application scenarios, place two pupils of a virtual viewer at the positions where two pupils of the viewer most frequently appear when he/she watches the curved display panel for 3D effect, as shown in the FIG. 8. Similarly, confirm the reference direction along the line connecting the central points of the two virtual pupils, and the reference vertical direction being perpendicular to the reference direction. Then a one-dimensional grating is adhered to the curved display panel for sending II-type viewing zones to the curved viewing-zone plane based on the grating light-splitting principle. In this process, the projection pupil of a pupil is determined by the method similar to that shown by the FIG. 7: the field angle of each pixel to the pupil intercepts an area on the viewing-zone plane, and all such intercepted areas together construct the projection pupil of this pupil. Then with projection pupils on the curved viewing-zone plane, the parameters of the curved display panel/grating are designed to send M'≥4 II-type viewing zones according to the criterion "each projection pupil of the virtual viewer intersects with more than one viewing zones and viewing zones intersected by different projection pupils of the virtual viewer are absolutely different". Here, the grating direction, along which the periodic units are arranged, is a curve and its inclined angle $\varDelta\theta$ to the reference direction changes with locations. The maximum value of abs($\varDelta\theta$) is limited to $\pi/4$ for covering two projection pupils of the virtual viewer with moderate number of II-type viewing zones. The interval $\varDelta d$ between adjacent viewing zones along the grating direction is smaller than the maximum size $P_{pupil}$ of the viewer's projection pupils along the grating direction.

In the practical application, the viewer is always moving somewhat. Firstly, through tracing of the viewer's pupils, the projection pupils of the virtual viewer are replaced by the real viewer's projection pupils in the FIG. 8. Then, check whether the II-type viewing zones generated according to the virtual viewer's projection pupils meet the demands "each projection pupil of the real viewer intersects with more than one viewing zones and the viewing zones intersected by different projection pupils of the real viewer are absolutely different". If the demands are met, no changing is needed, or only the viewpoint corresponding to each viewing zone is reset according to the positions of the real viewer's pupils. The setting of the viewpoint of each viewing zone may take the method similar to that discussed in the above FIG. 4. If the demands are not met, renew the reference direction and the reference vertical direction according to the concrete posture and position of the real viewer's pupils. Then, through adjusting the parameters of the curved display panel/grating pair, new II-type viewing zones are re-generated for the real viewer's pupils. Resetting the pixels corresponding to each periodic unit of the grating, following the guiding principle shown in FIGS. 6 and 7, the generated viewing zones also can be shifted along with the motion of the viewer's pupils. Instead of adjusting the parameters of the curved display panel/grating pair, a simple method is to adjust the posture and position of the curved display panel/grating pair accompanying with the motion of the viewer. The premise is that the relative position of the viewing zones to the viewer's pupils keeps being within a range where the viewing zones can keep holding the characteristics of the II-type viewing zone. Then, refresh each group of pixels on the display panel by the target three-dimensional scene's perspective view corresponding to the corresponding II-type viewing zone's viewpoint. At different time-points, repeat the above processes of tracing, judging, and information refreshing.

In some conditions, the tracing of the viewer is not necessary. Such as the condition that the viewer's motion is very limited, or the condition that the available observing zone constructed by the II-type viewing zones is very narrow, which have been described above when we talk about the I-type viewing zones.

Figure 9:
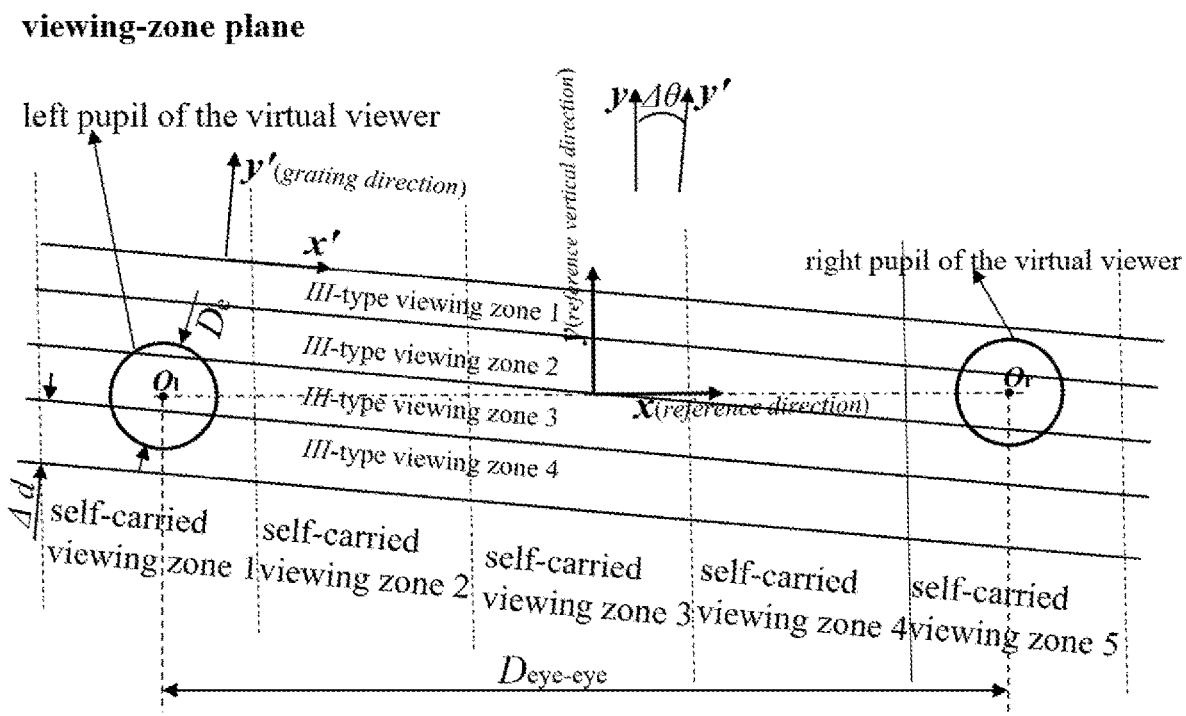
FIG. 9 shows the general spatial direction relation between the III-type viewing zones, the self-carried viewing zones, and the viewer's pupils when they are all on the viewing-zone plane.

FIG. 9 shows the spatial direction relation of the III-type viewing zones with the pupils of a virtual viewer when they share the common viewing-zone plane. The two virtual pupils are placed at the positions that the viewer most frequently appears when he/she watches the multi-view display panel for 3D effect. The reference direction is along the line connecting central points of the virtual viewer's two pupils, and the reference vertical direction is perpendicular to the reference direction. Here, the pupil diameter $D_{pupil}$ and eye distance $D_{eye-eye}$ of the virtual viewer both take average values. The multi-view display panel, which usually is composed of a flat display panel and affiliated self-carried optical component/components, has the ability of presenting multiple self-carried viewing zones. The arraying direction of these self-carried viewing zones usually has an acute inclination angle smaller than π/4 to the reference direction, and the light rays passing through one self-carried viewing zone are designed unable to reach both pupils of a viewer. Some existing optical structures can work as the multi-view display panel. For example, a self-carried grating on the display panel directs light beams from different groups of pixels on the display panel to different self-carried viewing zones. Under this condition, the self-carried grating is called as the affiliated self-carried optical component of the display panel. Another example is a display panel with multiple sequentially and circularly incident light beams converging to different viewing zone and synchronously refreshed by perspective view corresponding to the corresponding viewing zone. This time, the affiliated self-carried optical component/components is/are the optical element/elements providing sequentially and circularly incident light beams, such as such as several sequentially-turned-on-and-turned-off point-light-sources and a convergent lens placed between the point-light-sources and the display panel. A further example is a display panel with each pixel being a microstructure or controllable optical components which directs lights from different group of pixels to different viewing zone, such as a micro/nano grating or controllable micro mirrors. Then, adhere a one-dimensional grating to the flat display panel for projecting N III-type viewing zones to the viewing-zone plane. The light beams from N groups of pixels on the flat display panel pass through the corresponding III-type viewing zones, respectively. The arraying direction of the one-dimensional grating's periodic units is also named as the grating direction, and the generated III-type viewing zones are also aligned along the grating direction. In FIG. 9, the reference direction, the reference vertical direction, and the grating direction are denoted by x-direction, y-direction, and y'-direction, respectively. $\Delta\theta$ denotes the acute angle between the grating direction and the reference vertical direction. The x'-direction is perpendicular to the y'-direction.

The III-type viewing zones have some characteristics for presenting more than one perspective views to each eye of the viewer. Firstly, their number must not be less than 2. Here N=4 are taken as an example in the FIG. 9. Secondly, the interval $\Delta d$ between adjacent III-type viewing zones along the grating direction is less than the diameter of viewer's pupil $D_{pupil}$. The third one lies in the small enough abs($\Delta\theta$), so as to guarantee that each pupil of the viewer can intersect with more than one III-type viewing zones. As shown in the FIG. 9, the III-type viewing zones from 2 to 4 intersect with the viewer's left pupil, and the III-type viewing zones from 1 to 3 intersect with the viewer's right pupil.

Figure 10:
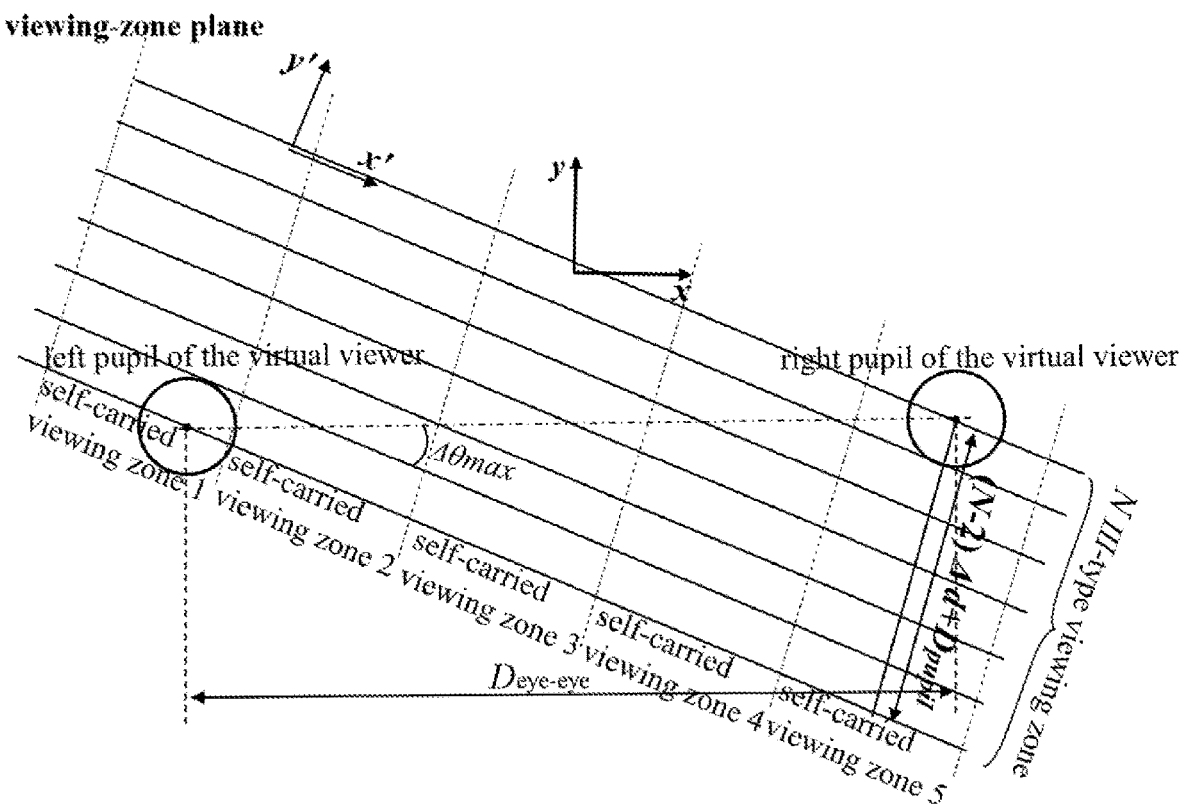
FIG. 10 shows the spatial direction relation of the III-type viewing zones with the viewer's pupils for allowable maximum value of abs($\Delta\theta$) when $D_{pupil}=2\Delta d$.

FIG. 10 shows the allowable maximum abs($\Delta\theta$)=arcsin$(((N-2)\Delta d+D_{pupil})/D_{eye-eye})$ when $D_{pupil}$=2$\Delta d$. Especially, very few III-type viewing zones, M=2, can realize two perspective views for each pupil of the viewer. This is also suitable for $D_{pupil}$<2$\Delta d$ and $D_{pupil}$>2$\Delta d$. When a large value of abs($\Delta\theta$)≥π/4 is chosen, too many small-interval III-type viewing zones are needed for covering each pupil of a viewer by more than one viewing zones. This applying patent is on proposing a method of covering each pupil of a viewer by more than one viewing zones through moderate or even very few number of grating-generating small-interval viewing zones. So, the value of abs($\Delta\theta$) is limited not larger than π/4. Thus, the value range of the abs($\Delta\theta$) can be determined by the formula:

$$\text{abs}(\Delta\varphi)\leq\min(\arcsin(((N-2)\Delta d+D_{pupil})/D_{eye-eye}),\pi/4).$$

Actually, at the situation of maximum abs($\Delta\theta$), a slight translation of the viewer's head leads to detaching of one pupil from the status of intersecting with more than one III-type viewing zones. This situation shall be avoided to satisfy that "each pupil of the viewer intersects with more than one III-type viewing zones". So, practically, the adopted value of abs($\Delta\theta$) should be away from the maximum value.

Due to the existing of the self-carried viewing zones, the sharing of a common III-type viewing zone by two pupils of a viewer is allowable. With the situation that the self-carried viewing zones and the III-type viewing zones being on the same viewing-zone plane as an example, as shown in the FIG. 11, the overlapping area between the self-carried viewing zone k and the III-type viewing zone n is named as effective viewing zone $EV_{kn}$, such as the $EV_{11}$, $EV_{34}$ of the FIG. 11. The pixel group corresponding to each effective viewing zone gets refreshed by the corresponding perspective view at the corresponding time-point. During this process, the concrete viewpoint of each effective viewing zone should be specified. With the premise that the viewpoint of an effective viewing zone should be around the corresponding pupil, there are multiple rules to determine the viewpoint of each effective viewing zone. For example, through the central point of a pupil, draw an assistant line. For each effective viewing zone intersecting with the pupil, the intersection point of the effective viewing zone's midline along the x' direction with the assistant line is taken as the viewpoint of this effective viewing zone, such as the $VP_{12}$, $VP_{13}$, $VP_{14}$ for the left pupil and $VP_{51}$, $VP_{52}$, $VP_{53}$ for the right pupil in the FIG. 11. The assistant lines drawn here are straight lines along the grating direction, and the interval between adjacent viewpoints along the grating direction is identical. But this exampled method is not obligatory. The assistant line may be straight line along other direction, or even be curved line. And the interval between viewpoints along the assistant line could be equally or unequally spaced. The viewpoints of the other effective viewing zones in the same self-carried viewing zones can be appointed by the same rule. More simply, the assistant line for each self-carried viewing zone may take its midline along the y' direction. When the pupil intersects the border line between adjacent self-carried viewing zones, the related self-carried viewing zones work as one expanded self-carried viewing zone and share a same assistant line.

In the practical application, through tracing, the virtual pupils are replaced by the real viewer's pupils in the FIG. 9. Then, check whether the III-type viewing zones generated according to the virtual viewer's pupils meet the demands "each pupil of the real viewer intersects with more than one III-type viewing zones for the virtual viewer's pupil". If the demands are met, no changing is needed, or only the viewpoint of each effective viewing zone is reset according to the positions of the real viewer's pupils. If the demands are not met, the reference direction and the reference vertical direction shall be renewed according to the concrete posture and position of the real viewer's pupils. Then, through adjusting the parameters of the flat display panel/grating pair, new III-type viewing zones are re-generated for the real viewer's pupils. For example, when a slit grating based on controllable liquid crystal is employed, the grating constant can be adjusted to change the value of $\Delta d$, the position of the viewing-zone plane, and the number of generated viewing zones. The grating direction can also be adjusted for different $\Delta \theta$ values. Another example, resetting the pixels corresponding to each periodic unit of the grating also can make the generated viewing zones move along with the motion of the viewer's pupils, according to the similar principle explained by the above FIG. 5 and FIG. 6. Instead of adjusting the parameters of the multi-view display panel/ grating pair, a simple method is to adjust the posture and position of the multi-view display panel/grating pair accompanying with the motion of the viewer. The premise is that the relative position of the generated viewing zones to the viewer's pupils keeps being within a range where the viewing zones can keep holding the characteristics of the III-type viewing zones.

When the viewpoints of the III-type viewing zones are determined, refresh each group of pixels on the display panel by the target three-dimensional scene's perspective view corresponding to the corresponding III-type viewing zone. Especially, a minimum N=2 corresponds to the situation that a group of two perspective views is presented to each eye of a real viewer with the help of self-carried viewing zones when his/her two projection pupils both intersect with the N=2 III-type viewing zones.

Then, at different time-points, repeat the above processes of tracing, judging, and information refreshing. In the judging process, the above criteria "each pupil of the real viewer intersects with more than one III-type viewing zones for the virtual viewer's pupil" may change to "each pupil of the viewer intersects with more than one III-type viewing zones determined at the last time-point".

Figure 11:
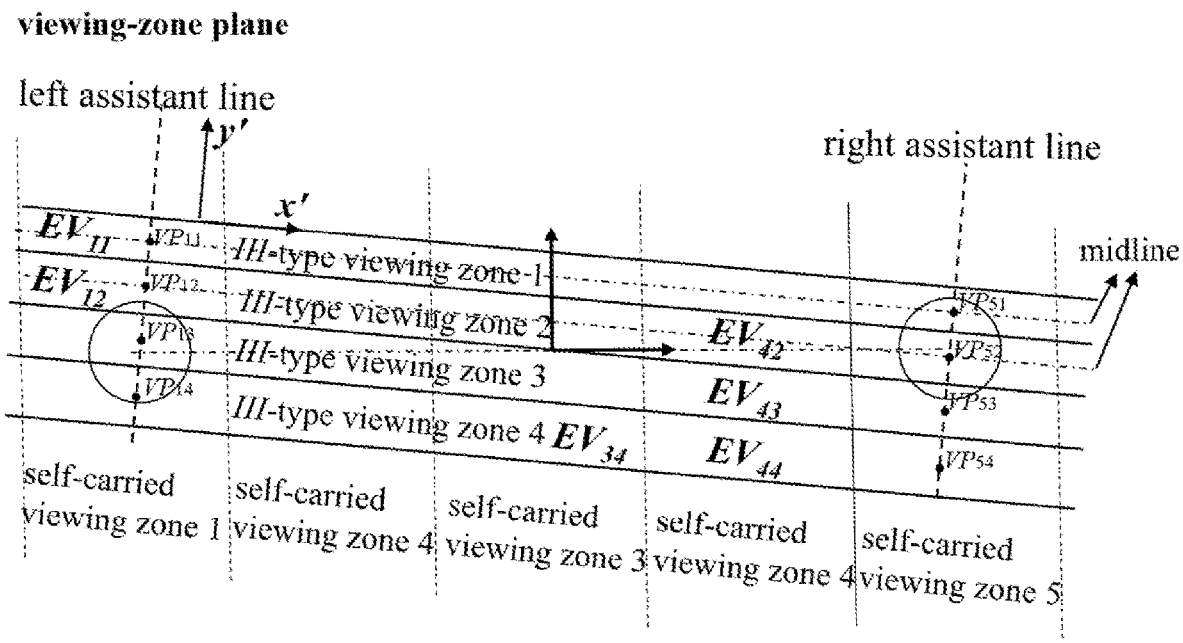
FIG. 11 shows a determining method of the viewpoint of each effective viewing zone.
Figure 12:
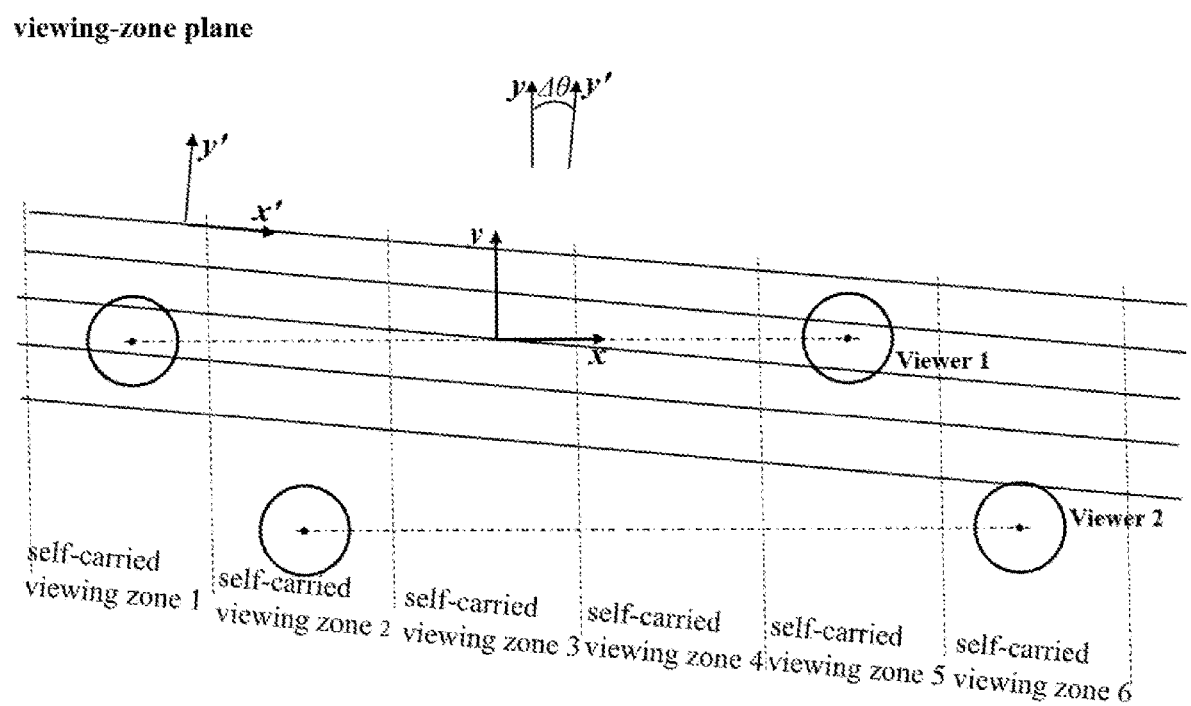
FIG. 12 shows the situation that the number of III-type viewing zones is not enough for covering two viewers' pupils.
Figure 13:
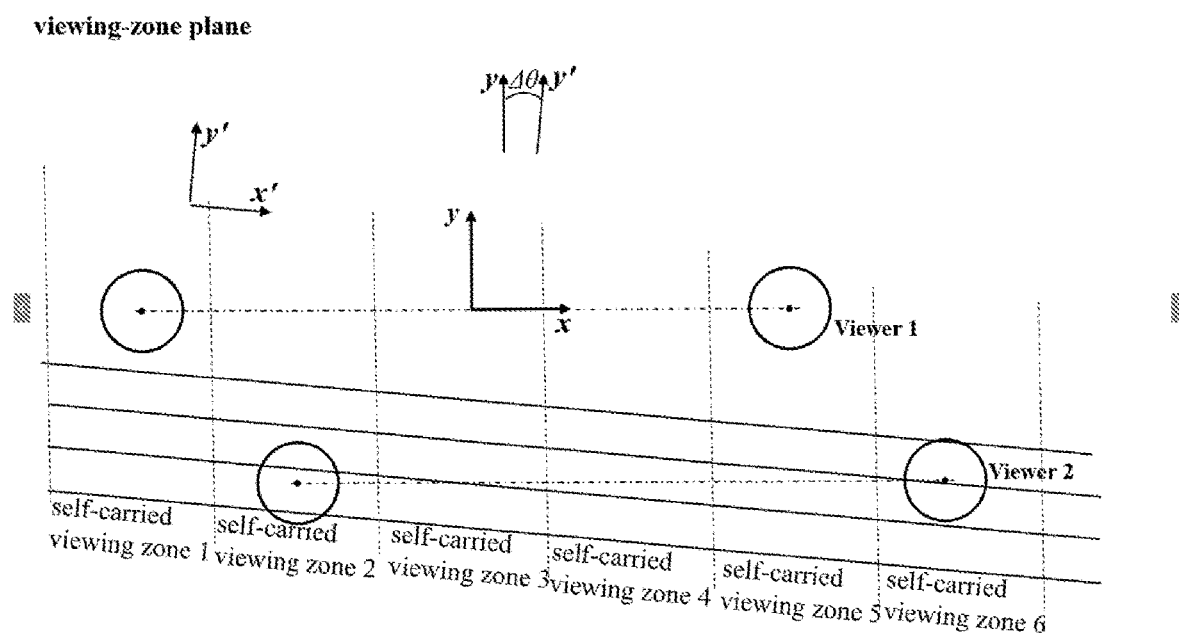
FIG. 13 shows the shifting of the limited number of III-type viewing zones to the other viewer's pupils at another time-point through resetting the pixels corresponding to each periodic unit of the grating.

The above FIGS. 9-11 all take one viewer as an example. When the number of the self-carried viewing zones and the III-type viewing zones both are enough for accommodating pupils of different viewers, 3D displays for multiple viewers can be implemented. Another situation is that the number of one type of viewing zones is not enough to cover pupils of different viewers. Such as shown in FIG. 12, the number of III-type viewing zones is not enough to cover two viewers' pupils. Under this condition, an optional method is to reset the pixels corresponding to each periodic unit of the grating for moving the limited III-type viewing zones to other viewers at the other time-points, as shown in the FIG. 13. When two kind distributions of III-type-viewing-zones are designed to appear alternatively, 3D displays for two viewers get realized. This can be expanded into the situation for multiple viewers. What needs to be noted is the crosstalk, for example, the crosstalk perceived by the viewer 2 at the time-point when the III-type viewing zones are assigned to the viewer 1. To settle this problem, the pixels corresponding to viewer 2-related self-carried viewing zones should be turned-off or display no information when the III-type viewing zones are assigned to the viewer 1.

Figure 14:
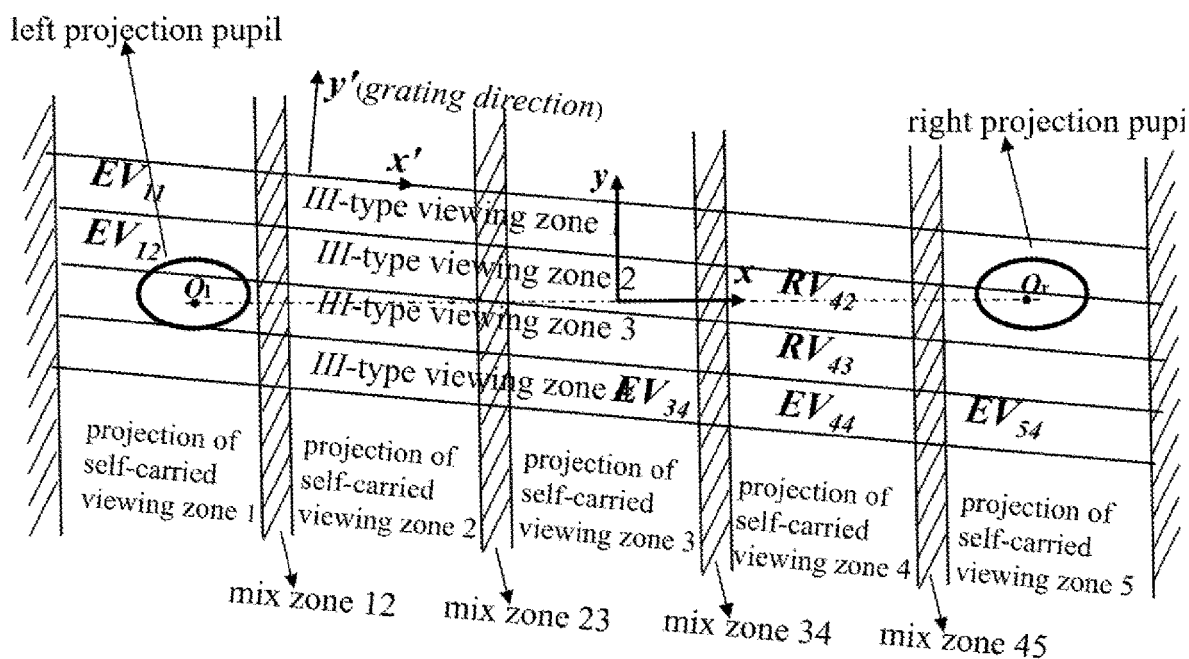
FIG. 14 shows the general spatial direction relation of the III-type viewing zones with the viewer's projection pupils on the viewing-zone plane.

Above embodiment is for the situation that self-carried viewing zones are just on the viewing-zone plane (constructed by the III-type viewing zones). The pupils of the real viewer are also confined to this plane. Actually, the self-carried viewing zones may be not on the viewing-zone plane and the pupils of a real viewer are always not on. Firstly, we particularly refer the plane containing the III-type viewing zones as the viewing-zone plane, when the self-carried viewing zones are not on this plane. Then we define the projection of a self-carried viewing zone as following: the field angle of each pixel to this self-carried viewing zone intercepts an area on the viewing-zone plane, and all such intercepted areas together construct the projection of this self-carried viewing zone. Secondly, for the real pupil not being on the viewing-zone plane, we use the term "projection pupil" defined in the above FIG. 7. Then, the projection of the self-carried viewing zone, the projection pupils of the real viewer, and the III-type viewing zones interlace on the viewing-zone plane, as shown in the FIG. 14. For the process of checking whether the viewing zones generated according to the virtual viewer's pupils meet the demands "each projection pupil of the real viewer intersects with more than one III-type viewing zones for the virtual viewer's pupils", the demands change to "each projection pupil of the real viewer intersects with more than one III-type viewing zones determined at the last time-point". Furthermore, the border line between adjacent self-carried viewing zones expands into a mix zone on the viewing-zone plane, for example, the mix zone 23 of the FIG. 14. When the projection pupil intersects the mix zone, the relevant two self-carried viewing zones are taken as one expanded self-carried viewing zone and share a same assistant line.

When the curved display panel is employed instead of the flat display panel, the similar operations as used in the above embodiments about III-type viewing zones are also applicable. Firstly, according to the application scenarios, place two pupils of a virtual viewer at the positions where two pupils of the viewer most frequently appear when he/she watches the curved display panel for 3D effect. Similarly, confirm the reference direction along the line connecting the central points of the two virtual pupils, and the reference vertical direction is perpendicular to the reference direction. Here, the pupil diameter $D_{pupil}$ and eye distance $D_{eye-eye}$ of the virtual viewer both take average values. The multi-view display panel, which is composed of a curved display panel and affiliated self-carried optical component/components, has the ability of presenting multiple self-carried viewing zones. The arraying direction of these self-carried viewing zones has an inclination angle smaller than $\pi/4$ to the reference direction, and the light rays passing through one self-carried viewing zone are designed unable to reach both pupils of a viewer. Then, adhere a one-dimensional grating to the flat display panel for projecting N' IV-type viewing zones to the viewing-zone plane. The light beams from N' groups of pixels on the flat display panel pass through the corresponding IV-type viewing zones, respectively. The arraying direction of the one-dimensional grating's periodic units is also named as the grating direction, and the generated IV-type viewing zones are also aligned along the grating direction. In this process, the projection pupil of a pupil is defined similarly. Then with projection pupils on the curved viewing-zone plane, the parameters of the curved display panel/grating are designed for sending N'≥2 IV-type viewing zones according to the criterion "each projection pupil of the virtual viewer intersects with more than one viewing zones". Here, the grating direction, along which the periodic units are arranged, is a curve and its inclined angle $\Delta \theta$ to the reference direction varies with locations. The maximum value of abs($\Delta \theta$) is limited to $\pi/4$ for covering two projection pupils of the virtual viewer through a moderate number of IV-type viewing zones. The interval $\Delta d$ between adjacent viewing zones along the grating direction is smaller than the maximum size $P_{pupil}$ of the viewer's projection pupils along the grating direction. Then, for real viewer's pupils, check whether the IV-type viewing zones generated according to the virtual viewer's projection pupils or determined at the last time-point meet the demands "each projection pupil of the real viewer intersects with more than one viewing zones". The following steps are similar to those in the embodiments about the III-type viewing zones.

Figure 15:
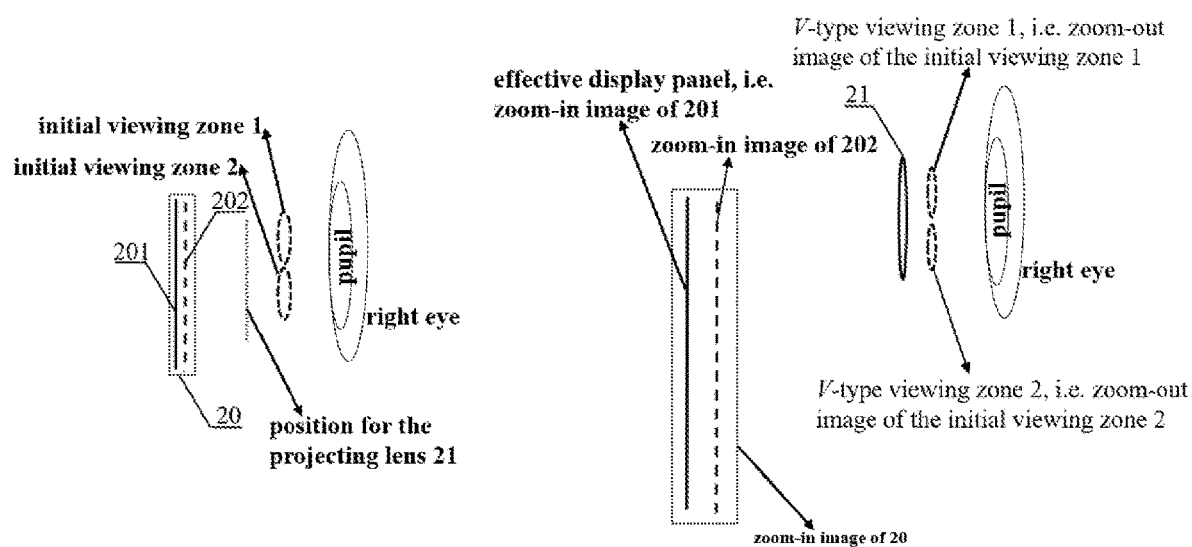
FIG. 15 shows the structure of a projecting unit which presents V-type viewing zones to a pupil.

FIG. 15 shows the situation when one display panel/grating pair is designed only for one eye of a viewer. As shown in the left part of the FIG. 15, a display panel/grating pair 20, constructed by a display panel 201 and a grating 202, projects L≥2 initial viewing zones to one pupil. Here L=2 and the right pupil of a viewer are taken as an example. The display panel 201 may be flat display panel, or be curved display panel. Then, insert a projecting lens 21 between the display panel/grating pair 20 and the initial viewing zones. The projecting lens 21 zooms in the display panel/grating pair 20, including the display panel 201, and zooms out the initial viewing zones, as shown in the right part of the FIG. 15. The zoomed-in display panel is named as effective display panel, and the zoomed-out initial viewing zones are named as V-type viewing zones. The V-type viewing zones have the characteristics: the interval $\Delta d$ along at least one arraying direction of the V-type viewing zones is smaller than the viewer's pupil diameter $D_{pupil}$. The combination of the projecting lens 21 and the display panel/grating pair 20 is named as projecting unit 200. When the projecting unit works, different groups of pixels on the display panel may display different images which are viewable through corresponding initial viewing zones. Due to zooming-in and zooming-out of the projecting lens, this could be equivalently taken as that different images displayed by different groups of pixels on the effective display panel are presented. And each presented image from the effective display panel is only viewable through the corresponding V-type viewing zone. Let the presented images by the effective display panel be the target three dimensional scene's perspective views converging to the corresponding V-type viewing zone. Then, the pupil near to or just intersecting with the V-type viewing zones can perceive more than one perspective views.

During this process, the determination of the viewpoint of a V-type viewing zone shall follow the premise that the viewpoint of a V-type viewing zone shall be around both this viewing zone and the position where the viewer's pupil appears frequently. For example, with a virtual pupil at the position where the viewer's pupil appears frequently, through the central point of this virtual pupil, draw an assistant line along the arraying direction of the V-type viewing zones. Then the intersection point between the assistant line and the midline of a V-type viewing zone is taken as this viewing zone's viewpoint. Of course, when the actual positions of the viewer's pupils are tracked, the virtual viewer's pupils can be replaced by real viewer's pupils for determination of the viewpoints.

In FIG. 15, only L=2 V-type viewing zones from a projecting unit are drawn for simplification. Actually, presenting L=2 V-type viewing zones by a projection unit is not the preferred scheme. In other word, such a scheme will result in a worse display effect. Through a grating, the lights from pixels on the effective display panel not only are directed to the target V-type viewing zones, but also propagates to the zones beyond the target V-type viewing zones as crosstalk noises. These zones beyond the target V-type viewing zones are named as noise zones. When only L=2 V-type viewing zones are generated, the pupil will intersect with noise zones and the crosstalk noise will be perceived by the pupil when $\Delta d < D_{pupil}/2$. Even when $\Delta d \geq D_{pupil}/2$, it is also difficult to avoid the crosstalk noise for the eye, because a common dislocation between the pupil and the L=2 V-type viewing zones always does exist, which will lead to intersection between the noise zones and the pupil. So, L>2 small-interval V-type viewing zones which can provide a redundant-spacing for the corresponding pupil are preferred by a projecting unit.

Figure 16:
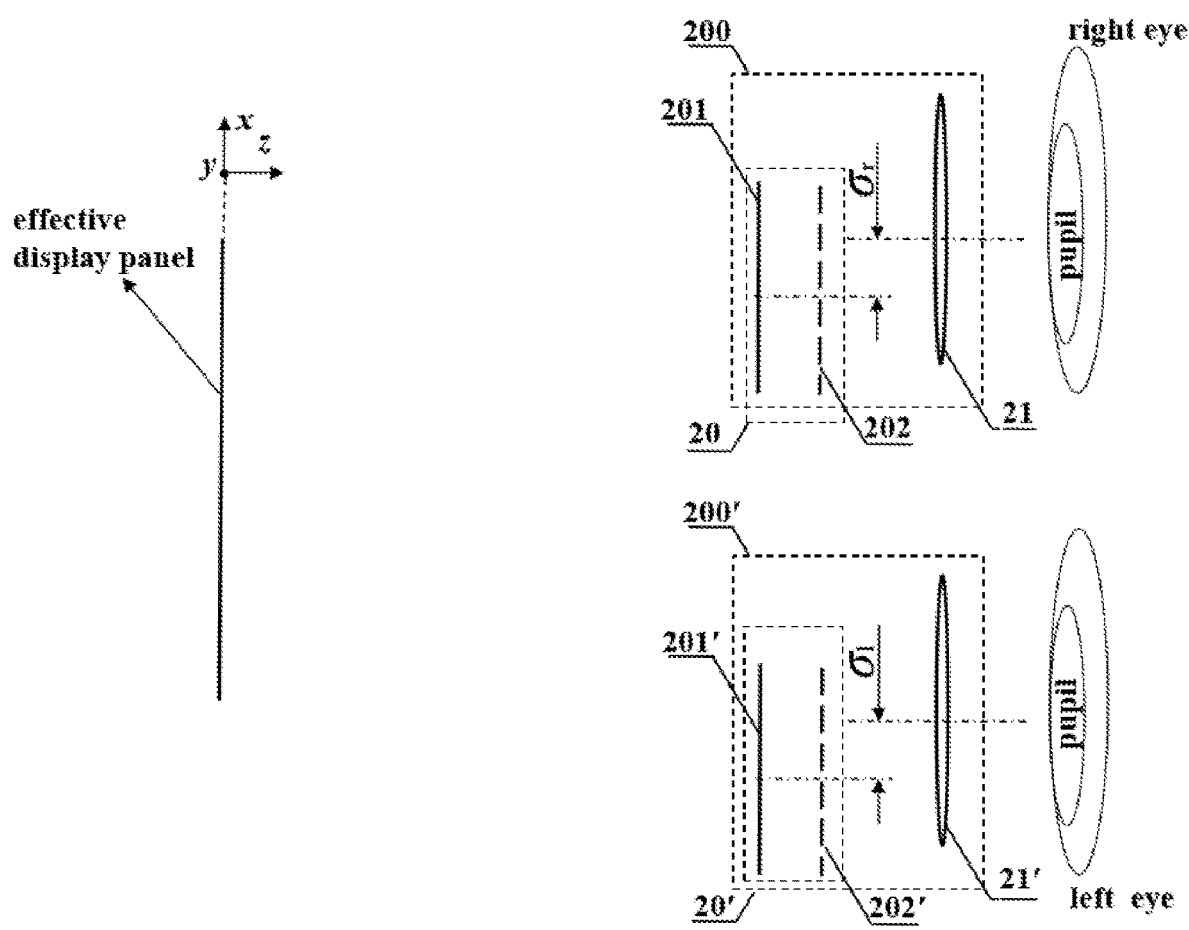
FIG. 16 shows the structure with two projecting units.

To cover two pupils of a viewer by the V-type viewing zones, two or more projecting units shall be aligned along one dimension or two dimensions. The V-type viewing zones for different pupils of a viewer are absolutely different. The simplest situation is one projecting unit for one pupil, as shown in FIG. 16, This is a near-eye virtual reality form. For the case of two or more projecting units in the structure, the relative position of the projecting lens and the display panel in each projecting unit shall be different and well designed for projecting different effective display panels around the target 3D scenes. As shown in the FIG. 16, the relative position offsets $\sigma_l$ and $\sigma_r$ between projecting lens and the display panel in the two projecting units make the two effective display panels completely overlapped. Of course, they may overlap partially or completely not.

Figure 17:
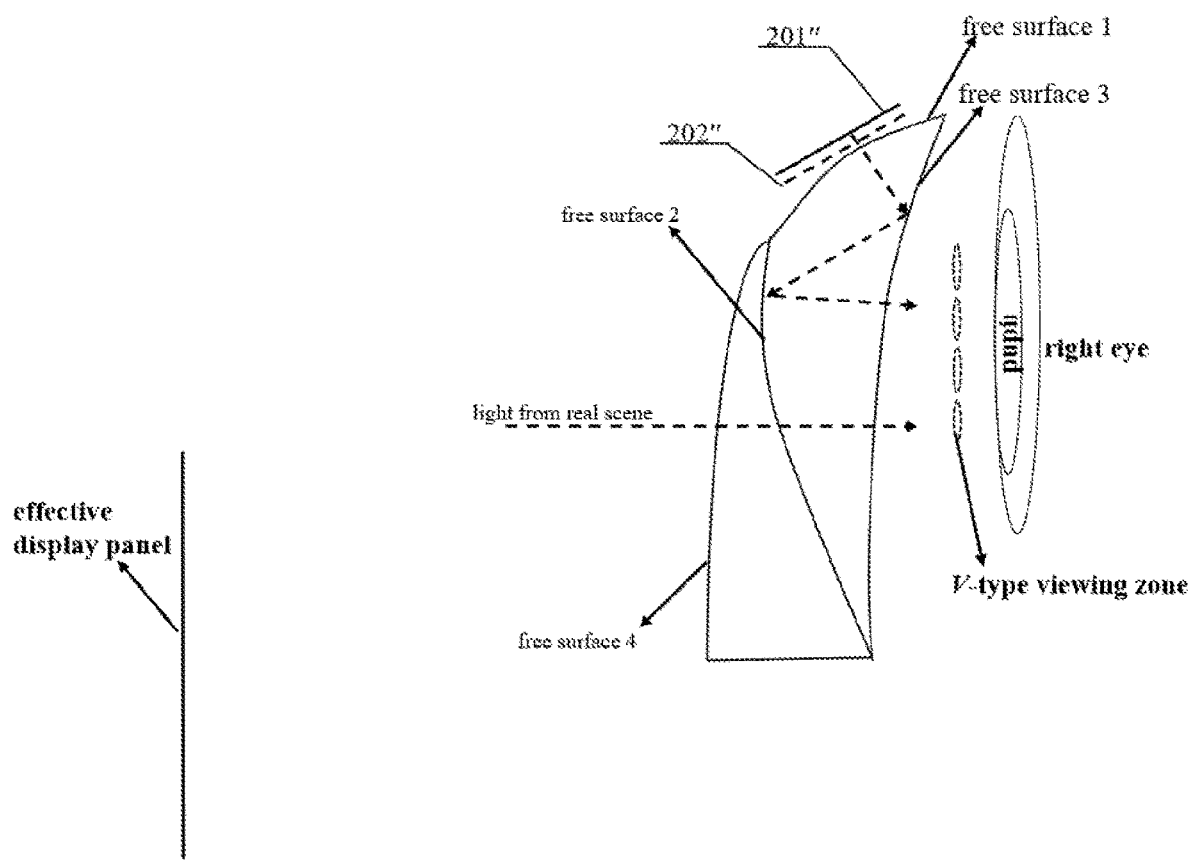
FIG. 17 shows an optical device which combines the functions of guiding component, combination component, the compensation component and the projection lens with a polyhedral optical element.

In the projecting unit, one or more components can be inserted between the display panel and the V-type viewing zones, such as a guiding component to re-direct propagating direction of the light beams from the display screen to corresponding V-type viewing zones, or a combination component for combining the displayed target 3D scene with the real scene, or a compensation component for eliminating the influence of the other inserted component/components on the light from real scene. These structures are often adopted in the head-mounted virtual reality form or argument reality form. Furthermore, two or more of these components, or even together with the projecting lens may be combined into one composite structure in one projecting unit. FIG. 17 shows an embodiment which makes the guiding component, combination component, the compensation component, and the projecting lens being combined into a polyhedral optical device with four free surfaces. The free surface 3 is a half-transmitting and half-reflecting mirror, functioning as a guiding component. The free surface 2 is also a half-transmitting and half-reflecting mirror, having the function of a combination component. At the same time, it plays another function of imaging the display panel/grating pair', together with the free surfaces 1 and 3. This means the free surface 1, the free surface 2 and the free surface 3 play the function of projecting lens, The free surface 4 is an extra compensation component eliminating the influences of the free surfaces 2 and 3 on the light from real scene.

Without needing to cover two pupils of a viewer with V-type viewing zones from a projecting unit, the necessary number of V-type viewing zones from one projecting unit can be very small. A lot of existing optical structures, such as those used for generating the self-carried viewing zones in the above embodiment, can be taken here to replace the display panel/grating pair for generating V-type viewing zones, with the generated viewing zones' interval being reduced appropriately.

A number of embodiments of the invention have been described. Nevertheless, it shall be understood that various modifications may be made without departing from the spirit and scope of the invention. For example, the multi-view display panel used for presenting self-carried multiple large-interval viewing zone to the viewer is not limited to the methods mentioned above. Any technology with the ability of presenting large-interval viewing zones could be used. For another example, the optical components which are used to image the display panel/grating pair, to re-direct the propagation direction of the light beams, to combine the generated three dimensional scenes and the reality scenes, are all not limited to those described above. Any combination of lenses, reflector, diffractive and holographic optical elements, or other light-controlling components may be used for these purposes. Accordingly, other embodiments within the scope of the following claims shall be seen as without departing from the spirit and scope of the invention.

What is claimed is:

1. A three-dimensional display method of presenting more than one perspective views to each eye of a real viewer by means of grating light-splitting, comprising:
   (S1) according to application scenarios, place two pupils of a virtual viewer at positions where two pupils of the real viewer most frequently appear when the real viewer watches a flat display panel for 3D effect, with a reference direction being set along a line connecting central points of two virtual pupils and a reference vertical direction being perpendicular to the reference direction;
   (S2) adhere an one-dimensional grating to the flat display panel for directing light beams from M≥4 groups of pixels on the flat display panel to corresponding M I-type viewing zones on a viewing-zone plane, respectively, with an arraying direction of periodic units of the one-dimensional grating being defined as a grating direction;
   wherein the I-type viewing zones have characteristics: an interval Δd between adjacent viewing zones along the grating direction is smaller than a diameter of the pupil $D_{pupil}$, and an inclination angle Δθ of the arraying direction of the viewing zones to the reference vertical direction satisfies $$\arcsin(D_{pupil}/D_{eye\text{-}eye}) \leq abs(\Delta\theta) \leq \min(\arcsin((D_{pupil}+(M-2)/\Delta d)/D_{eye\text{-}eye}), \pi/4),$$

is an eye distance of the real viewer;
   (S3) at a time-point t, detect a concrete posture and a position of the pupils of the real viewer, draw an actual reference direction and an actual reference vertical direction correspondently, and determine projection pupils of the pupils of the real viewer;
   wherein the projection pupil of the pupil of the real viewer is determined as following: a field angle of each pixel to the pupil of the real viewer intercepts an area on the viewing-zone plane, and all such intercepted areas together construct the projection pupil of the pupil of the real viewer;
   (S4) check a spatial relationship between the I-type viewing zones for the pupils of the virtual viewer or determined at a last time-point and the projection pupils of the real viewer, making sure its satisfaction of a criteria that each projection pupil of the real viewer intersects with more than one viewing zones and the viewing zones intersected by different projection pupils of the real viewer are absolutely different;
   (S5) for a denial result, adjust the posture and the position of the flat display panel/grating pair to meet the criteria of step (S4), or/and adjust parameters of the flat display panel/grating pair to re-generate new I-type viewing zones for the pupils of the real viewer;
   (S6) refresh each group of pixels on the flat display panel by a perspective view of a target three-dimensional scene for the correspondent I-type viewing zone;
   wherein a minimum M=4 represents the situation that two of four different perspective views are presented to each eye of the real viewer when the projection pupils of the viewer just intersect with two groups of four I-type viewing zones respectively on the viewing-zone plane;
   (S7) at different time-points, implement steps (S3) to (S6) repeatedly.

2. A three-dimensional display method of presenting more than one perspective views to each eye of a real viewer by means of grating light-splitting, comprising:
   (SS1) according to application scenarios, place two pupils of a virtual viewer at positions where two pupils of the real viewer most frequently appear when the real viewer watches a curved display panel for 3D effect, with a reference direction being set along a line connecting central points of two virtual pupils and a reference vertical direction being perpendicular to the reference direction;
   (SS2) adhere an one-dimensional grating to the curved display panel for directing light beams from M'≥4 groups of pixels on the curved display panel to corresponding M' II-type viewing zones on a viewing-zone plane, respectively, with an arraying direction of periodic units of the one-dimensional grating being defined as a grating direction;
   wherein the II-type viewing zones have characteristics: an interval Δd between adjacent viewing zones along the grating direction is smaller than a maximum size $P_{pupil}$ of the projection pupils of the real viewer along the grating direction, and an inclination angle abs(Δθ) of an arraying direction of the viewing zones to the reference vertical direction is designed appropriately for guaranteeing that each projection pupil of the virtual viewer intersects with more than one viewing zones and the viewing zones intersected by different projection pupils of the virtual viewer are absolutely different;
   wherein the maximum value of abs(Δθ) is not larger than π/4, abs( ) means the absolute function and the projection pupil of the pupil of the real viewer is determined as following: a field angle of each pixel to the pupil intercepts an area on the viewing-zone plane, and all such intercepted areas together construct the projection pupil of this pupil;
   (SS3) at a time-point t, detect a concrete posture and a position of the pupils of the real viewer, draw an actual reference direction and an actual reference vertical direction correspondently, and determine the projection pupils of the pupils of the real viewer;
   (SS4) check a spatial relationship between the II-type viewing zones for the pupils of the virtual viewer or determined at a last time-point and the projection pupils of the real viewer, making sure its satisfaction of a criteria that each projection pupil of the real viewer intersects with more than one viewing zones and the viewing zones intersected by different projection pupils of the real viewer are absolutely different;
   (SS5) for a denial result, adjust the posture and the position of the curved display panel/grating pair to meet the criteria of step (SS4), or/and adjust parameters of the curved display panel/grating pair for re-generating new II-type viewing zones for the pupils of the real viewer;
   (SS6) refresh each group of pixels on the curved display panel by a perspective view of a target three-dimensional scene for the correspondent II-type viewing zone;
   wherein a minimum M'=4 represents the situation that two of four different perspective views are presented to each eye of the real viewer when the projection pupils of the viewer just intersect with two groups of four II-type viewing zones respectively on the viewing-zone plane;

(SS7) at different time-points, implement steps (SS3) to (SS6) repeatedly.

3. A three-dimensional display method of presenting more than one perspective views to each eye of a real viewer by means of grating light-splitting, comprising:

(SSS1) according to application scenarios, place two pupils of a virtual viewer at positions where two pupils of the real viewer most frequently appear when the real viewer watches a multi-view display panel for 3D effect, with a reference direction being set along a line connecting central points of the two virtual pupils and a reference vertical direction being perpendicular to the reference direction;

wherein the multi-view display panel which is composed of a flat display panel and affiliated self-carried optical component/components can present multiple self-carried viewing zones;

wherein the self-carried viewing zones aligned along a direction with an inclination angle smaller than $\pi/4$ to the reference direction have characteristics: light rays passing through one self-carried viewing zone must not reach both pupils of the real viewer simultaneously;

(SSS2) adhere an one-dimensional grating to the flat display panel of the multi-view display panel for directing light beams from $N \geq 2$ groups of pixels on the flat display panel to corresponding N III-type viewing zones on a viewing-zone plane respectively, with an arraying direction of periodic units of the one-dimensional grating named as a grating direction;

wherein the III-type viewing zones have characteristics: an interval $\Delta d$ between adjacent viewing zones along the grating direction is smaller than a diameter of the pupil $D_{pupil}$, and an inclination angle $abs(\Delta\theta)$ of an arraying direction of the viewing zone to the reference vertical direction satisfies $$abs(\Delta\varphi) \leq min(arcsin(((N-2)\Delta d + D_{pupil})/D_{eye-eye}), \pi/4),$$

where $D_{eye-eye}$ is the eye distance of the real viewer;

(SSS3) at a time-point t, detect a concrete posture and a position of the pupils of the real viewer, draw an actual reference direction and an actual reference vertical direction correspondently, and determine projection pupils of the pupils of the real viewer;

wherein the projection pupil of the pupil of the real viewer is determined as following: a field angle of each pixel on the curved display panel to the pupil of the real viewer intercepts an area on the viewing-zone plane, and all such intercepted areas together construct the projection pupil of the pupil of the real viewer;

(SSS4) check a spatial relationship between the III-type viewing zones for the pupils of the virtual viewer or determined at a last time-point and the projection pupils of the real viewer, making sure its satisfaction of a criteria that each projection pupil of the real viewer intersects with more than one viewing zones;

(SSS5) for a denial result, adjust the posture and the position of the multi-view display panel/grating pair to meet the criteria of step (SSS4), or/and adjust the parameters of the multi-view display panel/grating pair to re-generate new III-type viewing zones for the pupils of the real viewer;

(SSS6) refresh each group of pixels on the flat display panel by a perspective view of a target three-dimensional scene for the correspondent III-type viewing zone/self-carried viewing zone pair;

wherein the minimum N=2 represents the situation that two perspective views are presented to each eye of the real viewer by the help of self-carried viewing zones when the two projection pupils of the viewer both intersect with the N=2 III-type viewing zones;

(SSS7) at different time-points, implement steps (SSS3) to (SSS6) repeatedly.

4. In the three-dimensional display methods of claim 3, the multi-view display panel is a display panel with self-carried grating which directs light beams from different groups of pixels on the display panel to different self-carried viewing zones.

5. In the three-dimensional display methods of claim 3, the multi-view display panel is a display panel with multiple sequentially and circularly incident light beams converging to different self-carried viewing zones;

wherein the affiliated self-carried optical component/components is/are the optical element/elements providing sequentially and circularly incident light beams, such as several sequentially-turned-on-and-turned-off point-light-sources and a convergent lens placed between the point-light-sources and the display panel.

6. In the three-dimensional display methods of claim 3, the multi-view display panel is a display panel with each pixel having a micro-structure, such as a micro grating, a nano grating or controllable micro mirrors, which directs lights from different group of pixels to different self-carried viewing zones.

7. A three-dimensional display method of presenting more than one perspective views to each eye of a real viewer by means of grating light-splitting, comprising:

(SSSS1) according to application scenarios, place two pupils of a virtual viewer at positions where two pupils of the real viewer most frequently appear when the real viewer watches a multi-view display panel for 3D effect, with a reference direction being set along a line connecting central points of two virtual pupils and a reference vertical direction being perpendicular to the reference direction;

wherein the multi-view display panel which is composed of a curved display panel and affiliated self-carried optical component/components can present multiple self-carried viewing zones;

wherein the self-carried viewing zones aligned along the direction with inclination angles smaller than $\pi/4$ to the reference direction have characteristics: light rays passing through one self-carried viewing zone must not reach both pupils of the real viewer simultaneously;

(SSSS2) adhere an one-dimensional grating to the curved display panel of the multi-view display panel for directing light beams from $N' \geq 2$ groups of pixels on the curved display panel to corresponding N' IV-type viewing zones on a viewing-zone plane respectively, with an arraying direction of periodic units of the one-dimensional grating named as the grating direction;

wherein the IV-type viewing zones have characteristics: an interval $\Delta d$ between adjacent viewing zones along the grating direction is smaller than a maximum size $P_{pupil}$ of the projection pupils of the real viewer along the grating direction, and an inclination angle $abs(\Delta\theta)$ of an arraying direction of the viewing zones to the reference vertical direction must be small enough that each projection pupil of the virtual viewer intersects with more than one IV-type viewing zones;

wherein the projection pupil of the pupil of the real viewer is determined as following: a field angle of each pixel to the pupil of the viewer intercepts an area on the viewing-zone plane, and all such intercepted areas together construct the projection pupil of this pupil;

(SSSS3) at a time-point t, detect a concrete posture and a position of the pupils of the real viewer, draw an actual reference direction and an actual reference vertical direction correspondently, and determine the projection pupils of the pupils of the real viewer;

(SSSS4) check a spatial relationship between the IV-type viewing zones for the pupils of the virtual viewer or determined at a last time-point and the projection pupils of the real viewer, making sure its satisfaction of a criteria that each projection pupil of the viewer intersects with more than one viewing zones;

(SSSS5) for a denial result, adjust the posture and the position of the multi-view display panel/grating pair to meet the criteria of step (SSSS4), or/and adjust parameters of the multi-view display panel/grating pair to re-generate new IV-type viewing zones for the pupils of the real viewer;

(SSSS6) refresh each group of pixels on the curved display panel by the a perspective view of a target three-dimensional scene for the correspondent IV-type viewing zone/self-carried viewing zone pair;

wherein the minimum N'=2 is corresponding to the situation that two perspective views are presented to each eye of the real viewer by the help of self-carried viewing zones when the two projection pupils of the viewer both intersect with the N'=2 IV-type viewing zones;

(SSSS7) at different time-points, implement steps (SSSS3) to (SSSS6) repeatedly.

8. In the three-dimensional display methods of claim 7, the multi-view display panel is a display panel with self-carried grating which directs light beams from different groups of pixels on the display panel to different self-carried viewing zones.

9. In the three-dimensional display methods of claim 7, the multi-view display panel is a display panel with multiple sequentially and circularly incident light beams converging to different self-carried viewing zones;

wherein the affiliated self-carried optical component/components is/are the optical element/elements providing sequentially and circularly incident light beams, such as several sequentially-turned-on-and-turned-off point-light-sources and a convergent lens placed between the point-light-sources and the display panel.

10. In the three-dimensional display methods of claim 7, the multi-view display panel is a display panel with each pixel having a micro-structure, such as a micro grating, a nano grating or controllable micro mirrors, which directs lights from different group of pixels to different self-carried viewing zones.

11. A three-dimensional display method of presenting more than one perspective view to each eye of a real viewer by means of grating light-splitting, comprising:

(SSSSS1) adhering a grating to a display panel to form a display panel/grating pair for directing light beams from L groups of pixels on the display panel to corresponding L viewing zones, wherein L>2 and each of the L viewing zones is a region where the light beams from the corresponding group of pixels on the display panel converge to after being light-split by the grating, and the L viewing zones are named as initial viewing zones respectively, and then inserting a projecting lens between the display panel/grating pair and the initial viewing zones to zoom in the display panel and zoom out the initial viewing zones, wherein the zoomed-in display panel is named as an effective display panel, the zoomed-out initial viewing zones are named as V-type viewing zones which have an interval of $\Delta d$ smaller than the diameter of the pupil $D_{pupil}$, and a combination of the projecting lens and the display panel/grating pair is named as a projecting unit;

(SSSSS2) aligning two or more projecting units along one dimension or two dimensions for generating more V-type viewing zones for eyes of a viewer or viewers, wherein a relative position of the projecting lens and the display panel in each projecting unit is different for projecting different effective display panels around the target three-dimensional scenes;

(SSSSS3) at a time-point t, refreshing each group of pixels on each display panel by a perspective view of a target three-dimensional scene for the correspondent V-type viewing zone; and (SSSSS4) at different time-points, implementing step (SSSSS3).

12. In the three-dimensional display method of claim 11, the projecting unit has one or more of following components inserted between the display panel and the V-type viewing zones: a guiding component to re-direct a propagating direction of the light beams from the display screen to corresponding V-type viewing zones, and/or a combination component for mixing a displayed target three-dimensional scene and a real scene, and/or a compensation component for eliminating the influence of inserted component/components on the light from the real scene.

* * * * *